United States Patent [19]
Ammler et al.

[11] Patent Number: 5,969,631
[45] Date of Patent: Oct. 19, 1999

[54] METHOD AND CONTROL SYSTEM FOR THE SYNCHRONIZED TRANSMISSION OF DIGITAL DATA

[75] Inventors: Manfred Ammler, Bergheim; Peter Hora, Schrobenhausen; Guenter Fendt, Schrobenhausen; Norbert Mueller, Schrobenhausen, all of Germany

[73] Assignee: TEMIC TELEFUNKEN microelectronic GmbH, Heilbronn, Germany

[21] Appl. No.: 08/876,574

[22] Filed: Jun. 16, 1997

[30] Foreign Application Priority Data

| Jun. 14, 1996 | [DE] | Germany | 196 23 750 |
| Oct. 19, 1996 | [DE] | Germany | 196 43 205 |
| Jan. 23, 1997 | [DE] | Germany | 197 02 271 |

[51] Int. Cl.$^6$ .................................................... H04L 7/00
[52] U.S. Cl. ............................... 340/825.21; 340/825.14; 340/825.44; 375/362; 375/364; 375/371; 375/373; 375/376; 370/503; 370/509; 370/514; 370/516; 370/520
[58] Field of Search ................ 340/825.21, 825.44, 340/825.14; 375/362, 364, 371, 373, 376; 370/503, 509, 514, 516, 520

[56] References Cited

U.S. PATENT DOCUMENTS

| 4,229,825 | 10/1980 | Guidoux | 375/371 |
| 4,411,007 | 10/1983 | Rodman et al. | 375/371 |
| 4,988,989 | 1/1991 | Goto | 340/825.21 |
| 5,594,763 | 1/1997 | Nimishakavi | 375/376 |
| 5,612,681 | 3/1997 | Funahashi et al. | 340/825.31 |
| 5,787,132 | 7/1998 | Kishigami et al. | 375/364 |

FOREIGN PATENT DOCUMENTS

| 0008238 | 2/1980 | European Pat. Off. . |
| 2657365 | 3/1978 | Germany . |
| 19509534 | 9/1995 | Germany . |

*Primary Examiner*—Brian Zimmerman
*Assistant Examiner*—Yves Dalencourt
*Attorney, Agent, or Firm*—W. F. Fasse; W. G. Fasse

[57] ABSTRACT

In a method and system for transmitting digital data, a data acceptance clock signal generator that has a controllable clock frequency in a peripheral module is correspondingly adapted to clock frequency information derived from a synchronization pulse train transmitted by a central unit. The same oscillator is used as a frequency source for determining the clock frequency information and for generating the data acceptance clock pulse. In this manner, simple RC oscillators are adequate to fulfill any requirements of long time accuracy of the oscillator. The clock frequency can be changed in that the central unit simply transmits altered clock frequency information. It is also possible to carry out an adjustment or adaptation in the case of deviations of the oscillator frequency in the peripheral unit. Preferably, the clock frequency information is derived from the reciprocal value of the time duration of at least one synchronization pulse, which is determined in a quantized manner by a first counter in a clock frequency information acquisition circuit which counts the number of oscillator pulses occurring during the synchronization pulse. The resulting count value is provided to a data acceptance clock signal generator, which is clocked by the same oscillator and counts the number of oscillator pulses until reaching a prescribed threshold value, whereupon it outputs a corresponding clock signal. By properly adapting numerical elements, it is also possible to process pulse width modulated signals using the present method and apparatus.

35 Claims, 11 Drawing Sheets

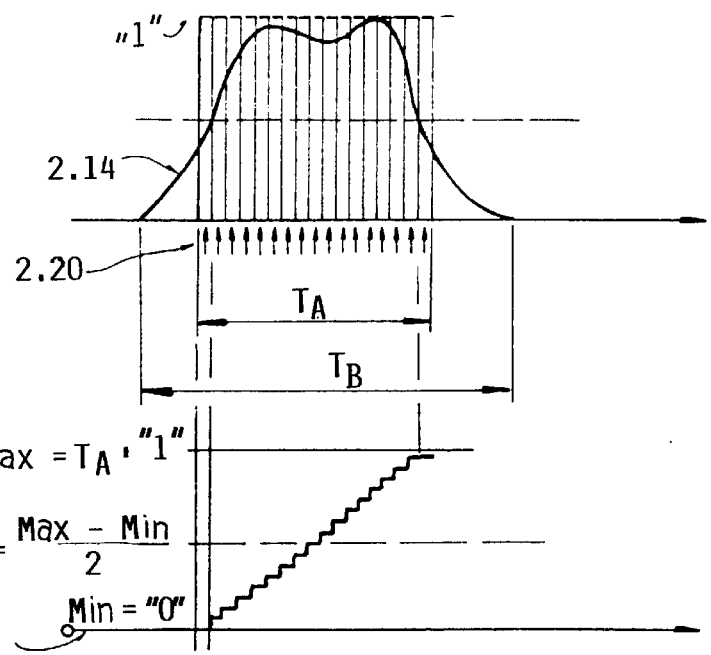
FIG. 10
FIG. 11
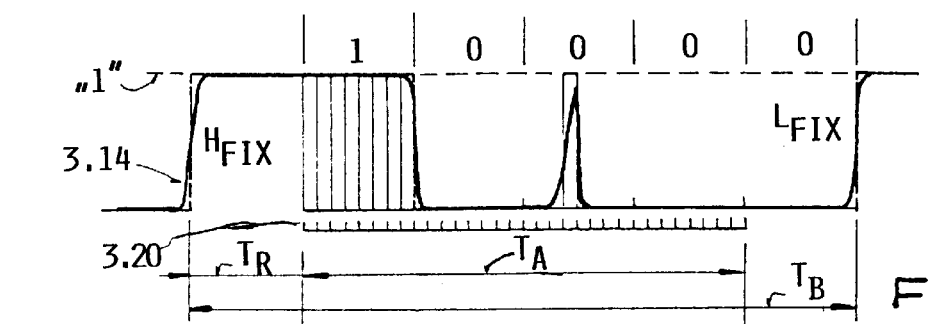
FIG. 12
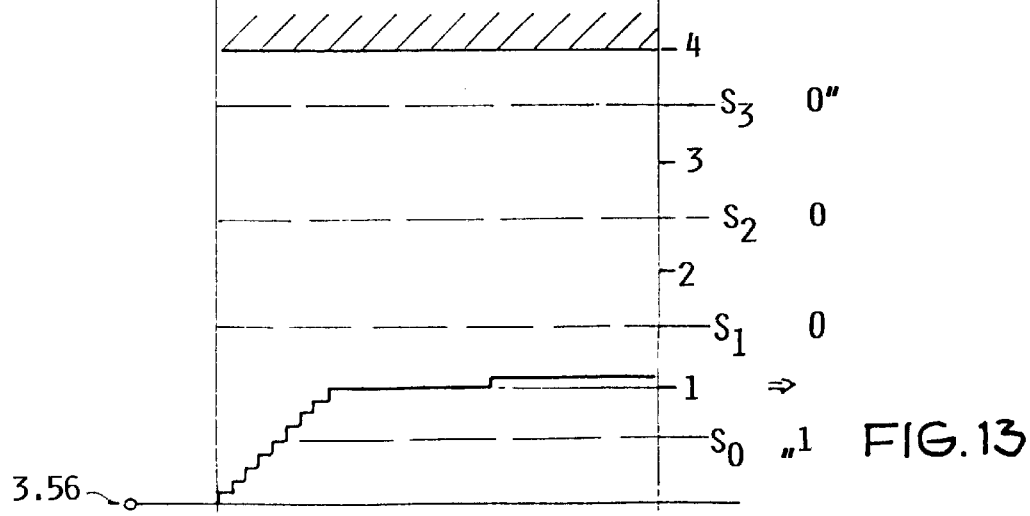
FIG. 13

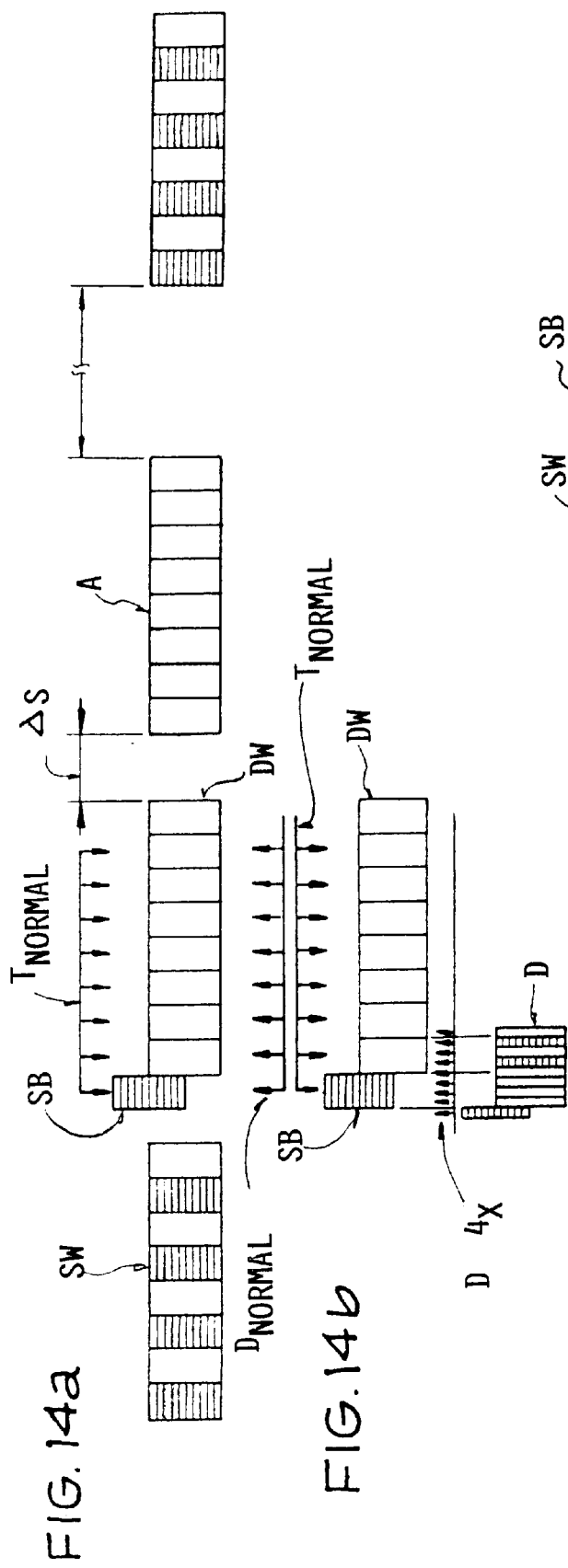
FIG.14a
FIG.14b
FIG.14c
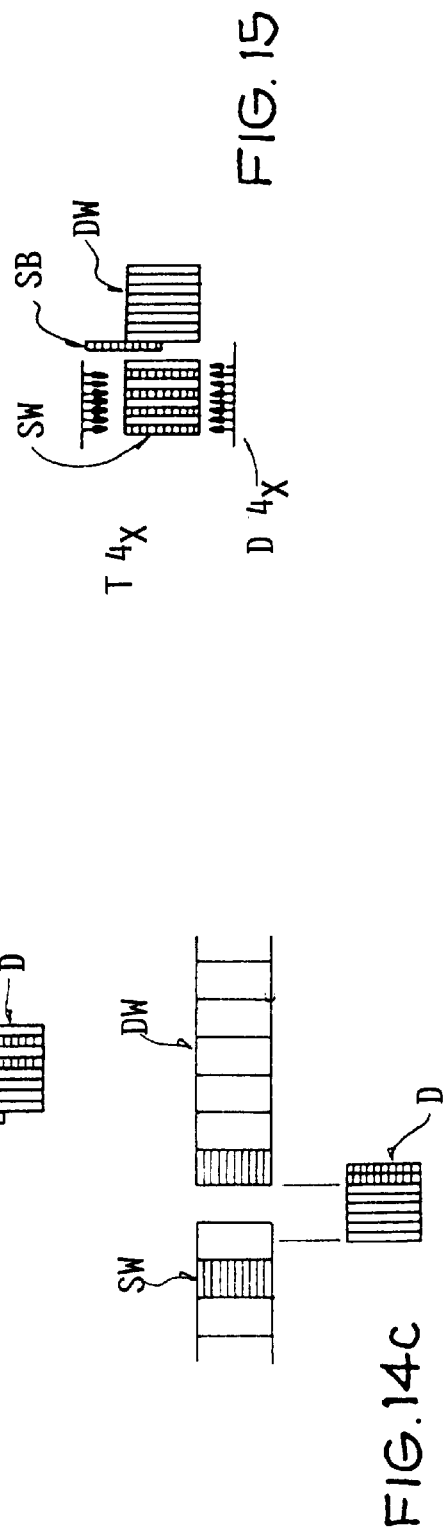
FIG.15

METHOD AND CONTROL SYSTEM FOR THE SYNCHRONIZED TRANSMISSION OF DIGITAL DATA

FIELD OF THE INVENTION

The invention relates to a method for transmitting digital data in at least a selectively synchronized manner, as well as a control system for carrying out the method.

BACKGROUND INFORMATION

The transmission of digital data is necessary in a great number of systems in which a central station or unit, such as a central processing unit or a central control unit, for example, must exchange data with one or more peripheral modules. In order to achieve this, bus systems are typically used, over which the individual data units are transmitted at a certain prescribed clock frequency. In order that a peripheral module can properly receive and recognize without errors the digital data transmitted by the central unit, it is necessary that the peripheral module accepts the incoming data at the same clock frequency at which the data were transmitted.

In order to ensure that the central unit and the peripheral modules operate with the same clock frequency for carrying out a data exchange, it is known to use highly exactly operating clock signal generators with mutually matched clock frequencies in the central unit as well as in the peripheral modules. However, such highly accurate clock signal generators require high precision components, such as quartz crystal oscillators, for example, in order to very precisely maintain the clock frequency at a constant value even over a long period of time. For this reason, such highly accurate clock signal generators are relatively complicated and expensive. Furthermore, even such clock signal generators can drift or become unsynchronized from one another over time.

Other systems for synchronizing the data acceptance or pulse frame clock cycle are known, for example as described in German Patent Publication 2,657,365 B1 and in U.S. Pat. No. 4,988,989. Therein, in order to achieve a time-matching of the transmitting cycle with the receiving cycle, a synchronization pulse or synchronization pulse train having a known form, for example, having known signal level variations, is periodically transmitted. Moreover, U.S. Pat. No. 4,988,989 describes a master-slave communication system in which an initiallizing data signal activates a separate timer provided in the slave. In this manner, a time synchronized sampling of the subsequently transmitted data is made possible. German Patent Publication 2,657,365 B1 describes a method for frame synchronization of a time division multiplexing system in which the counters are correspondingly reset with reference to a synchronization recognition signal and thereby a synchronization is achieved. It is also known to use a synchronizing word comprising a plurality of low and high signal levels, for achieving a synchronization.

Moreover, it is also known to use coding methods, such as the Manchester process for example, in which the clock cycle information can be recovered.

Another possibility for assuring the same clock frequency in the central unit and in the peripheral modules is to connect all of the peripheral modules with the central unit over respective additional clock conductors or lines. However, the provision of such additional clock lines for ensuring a common synchronous system clock signal becomes extremely complicated and costly, especially in systems in which a central control device must exchange data with a plurality of decentralized or peripheral modules, such as in decentralized safety systems in motor vehicles. Moreover, motor vehicle safety systems are becoming ever more complex along with the increasing requirements for increased safety for occupants of the vehicle. Thus, as more safety systems, such as for example side air bags and the like, are being called for in addition to a driver side air bag, a passenger side air bag, seat belt tensioners, roll-over bars, and the like, correspondingly also the number of required peripheral modules and thus also the number of the end stages for triggering or activating the individual safety systems is increasing considerably. As a result of this increasing complexity and number of end stages in a vehicular safety system, the known data bus systems either require a correspondingly increased number of the above described highly accurate and expensive clock signal generators, or the assembly and installation of the system becomes ever more complex and costly in view of the installation of separate clock cycle lines connecting the central unit with the peripheral modules.

SUMMARY OF THE INVENTION

In view of the above, it is the aim of the invention to avoid the disadvantages of the prior art as discussed above. More specifically, the invention aims to provide a method as well as a control system for transmitting digital data, by which it is especially achieved that the peripheral modules of a system will operate, at least during the data exchange, on a system clock cycle generated by the central unit, without requiring the use of complicated apparatus-technical measures.

The above objects can be achieved in a method for transmitting digital data according to the invention in which a synchronization pulse train including at least one synchronization pulse is transmitted before transmitting the data to be transmitted, whereby the synchronization pulse train is used to synchronize a data acceptance clock signal generator on the receiver end. The synchronization pulse train contains the synchronization time point information as well as the clock frequency information, which is determined or derived at the receiver end, and the clock frequency of the data acceptance clock cycle is matched or adapted corresponding to the determined clock frequency information by means of a data acceptance clock signal generator that has a controllable clock frequency.

The above objects can further be achieved in a control system for transmitting digital data according to the invention, which can be used to carry out the inventive method, and wherein each peripheral module comprises a clock frequency information acquisition circuit that determines or acquires the clock frequency information contained in the synchronization pulse train in a clocked or cycled manner by means of an oscillator, and which then further provides the clock frequency information to a clock signal generator that has a variable clock frequency. The clock signal generator, in turn, is clocked or cycled by the same oscillator, and generates a data acceptance clock signal corresponding to the clock frequency information.

In the basic method according to the invention, during the data exchange, a synchronization pulse train comprising at least one synchronization pulse is transmitted together with the digital data that are to be transmitted. On the receiving end, the synchronization time point as well as the clock frequency information including the transmitting clock cycle is determined from the synchronization pulse train. A data acceptance clock signal that is synchronized with the transmitting clock cycle or signal is then derived from this clock frequency information, in that a data acceptance clock signal generator having a controllable clock frequency is correspondingly matched to the transmitting clock cycle. In this manner, the invention avoids the need, at least at the receiver end, of high precision oscillators that operate stably over a long period of time, or of an additional clock signal line.

Since a synchronization of a peripheral system clock signal generator circuit with the transmitting clock signal is carried out at each data transmission, it is possible to use a relatively simple oscillator, such as an RC oscillator having a resistor and a capacitor, since any temperature or age dependent variations in the oscillation frequency of the oscillator are compensated for at each reception of data. For example, if the clocking rate or frequency of the oscillator increases due to the heating-up of the device, then on the one hand the clock frequency information will be accepted and evaluated at this increased clocking rate and on the other hand the data acceptance clock signal will also be generated with this increased clocking rate, so that there is no significant deviation in the final effect in real practical terms.

A further, especially surprising advantage of the method for transmitting digital data according to the invention is that the central unit can send the data that is to be transmitted at varying or different transmitting clock rates. Thus, especially in safety systems, it becomes possible to transmit the triggering information for activating the individual safety devices at a relatively fast transmitting clock rate, while for example self test information can be transmitted and exchanged at a relatively slow transmitting clock rate. In this manner, the information transmission and processing for monitoring the peripheral modules can be simplified without negatively influencing the triggering speed of the safety devices.

It is especially advantageous according to a further detail of the invention if the clock frequency for the data acceptance clock signal is derived from the time duration of at least one synchronization pulse. By determining the time duration of the synchronization pulse, it is easy to determine or reach a conclusion, for the frequency derived from the time duration substantially by the reciprocal thereof, as to the clock frequency information. In this context, it is particularly advantageous according to the invention that the time duration of the synchronization pulse may respectively correspond to the duration of a data pulse, so that the simplest form of a data acceptance clock cycle can be derived directly from the time duration of the synchronization pulse, since the data acceptance interval exactly corresponds to the time duration.

However, as a general matter, other possibilities for determining or deriving the required clock information also exist, for example by means of a whole number multiple or a whole number fractional portion of the time duration, or by subtraction of a predetermined value from the time duration. In these ways, it is possible to adapt the inventive method to specific individual cases using only simple measures without deviating from the basic principle of the invention. For example, if the synchronization pulses are embodied corresponding to a data pulse that is to be transmitted, then these synchronization pulses may also be generated in a manner similar to the data pulses that are to be transmitted, so that no special devices are required for generating and transmitting the transmitting clock information. Especially, the synchronization pulses may be stored as a synchronization word similarly to a data word. In this case, the synchronization word may be fetched from a memory or register and transmitted just like a data word serving for the transmission of information. In this context, the data pulses can be grouped together in the form of data words having a prescribed number of pulses or bits, whereby a pulse may take either one of exactly two binary states, namely a high state or signal level and a low state or signal level are allowable. In order to determine the time duration of a synchronization pulse, corresponding signal level variations or state transitions are to be provided, for example preferably a sequence of a plurality of synchronization pulses with alternating signal levels.

The data transmission may be interrupted by a dead time after each data word, whereby the length of the dead time is preferably selected to be greater than the length of a data word. Data are only transmitted when there is a demand for such data transmission. Moreover, in this case, the very next signal level transition or change following a dead time may be immediately recognized as a synchronization pulse. If no dead time is provided, the end of one data word and the beginning of the next synchronization pulse can be determined by counting the data pulses that have already been transmitted within a data word.

The method according to the invention is also applicable to pulse width modulated (PWM) signals, because for such PWM signals the clock frequency information can be derived from a synchronization pulse in the same manner as described above, in that this information is once again contained within the time duration of the synchronization pulse. Due to the requirements of recovering the clock cycle time points, respective signal level changes must be provided between the individual PWM words. This is preferably achieved in that the information is encoded over the duration of the presence of a first signal level within a fixed or predetermined pulse frame, whereby the first signal level is present for at least a short time duration. At the end of a PWM word, the signal will have the second signal level for at least a defined time duration, whereupon respectively at the beginning of the next PWM data word a signal level change or transition will occur. In this context, the PWM data word can encode more than two logical signal levels in the length of time of the presence of the first signal level, for example, it may comprise eight different lengths that correspond in binary to a three bit information, since $2_3=8$.

In order to now determine in a simple manner the frequency information of the synchronization pulse, the time duration of the individual synchronization pulses is compared with an oscillator frequency generated on the receiver end, so that the respective time duration of the pulses is saved or stored as a count value of the number of oscillator cycles that transpire during a synchronization pulse. In order to minimize the error arising due to the resulting quantization of the count value, the oscillator frequency must preferably be considerably greater than, and preferably a multiple of, the pulse duration. In this context, if the oscillator frequency is ten-fold higher, then the error will amount to ±10%, while if the oscillator frequency is 100-fold higher, the error will amount to only ±1%. The current value of the interval between a respective system clock signal and the next system clock signal can be derived from the determined count value, either directly by setting them equal, or indirectly by subtraction and/or division, depending upon whether or not the length of the synchronization pulse corresponds to a data pulse.

According to further advantageous details of the invention, the risk of recognition errors can be reduced by multiple or redundant determination of the values and/or comparison of the determined values with an acceptable value range.

The invention further provides that a prescribed auxiliary value may be selected as the current value of the interval spacing between two receiver-end system clock signals. Preferably, the auxiliary value respectively corresponds to one half, and especially preferably one quarter of the value range that is typical in normal operation. This embodiment of the invention has the advantage that the receiver end is again very quickly ready to receive new data and is matched or adapted to an emergency frequency that is compatible with the transmitter end for accelerated transmission of data, independent of whether or not a corresponding synchronization pulse was recognized. Thus, the recognition of an emergency signal is always assured.

It is also possible to generate the system clock signal by the overflow counter principle, based on the determined current value of the system clock signal interval. Namely, a system clock signal is generated at the latest at the beginning of the first data pulse, and the number of the oscillator cycles is reset and counted anew until the current value of the system clock signal interval is reached, and then once again a system clock signal is generated and the counting of the oscillator cycles is once again reset and re-started.

In this context, it is especially advantageous according to the basic concept of the invention, that both the determination of the clock frequency information as well as the generation of the system clock signal, with cyclical matching, are always based on the same oscillator cycles. Thus, if the cycle frequency of the simple oscillator in the receiver increases due to the heating-up of the components, age effects, or the like, then the count value of the oscillator cycles occurring during one clock frequency interval will deviate from the original or nominal value, but the data acceptance clock signal will also be generated based on this higher oscillator frequency, so the actual or real deviation of the system clock signal is limited purely to the quantization error in the count value of the oscillator cycles. Moreover, due to the transmission of the clock cycle frequency information with each synchronization pulse, matching of the transmitter clock frequency is possible for each pulse, since only the count value of the oscillator cycles transpiring during the synchronization pulse will be increased or reduced and correspondingly the system clock signal generation will be nominally slowed-down or accelerated. The quantization error that can also possibly arise in this case is insubstantial if the oscillator frequency is properly selected. A further advantage is the particularly simple realization according to the invention in comparison to that achieved by means of counter loops.

If the data are to be transmitted in pulse-width modulated form, then the basic principle of the invention as described may be equivalently applied in that once again the time duration of the synchronization pulse is determined from the number of the oscillator cycles, and the data acceptance clock signal is derived therefrom. However, since a plurality of pulse duration signal level lengths are possible within a pulse frame in a PWM data word, it is necessary to sample at a correspondingly higher rate, so that the count value of the oscillator cycles initially only indicates the actual value of the pulse frame clock cycle width. Once again a system clock signal, in this case a pulse frame clock signal, is generated in that the number of oscillator cycles is counted at least synchronously with the first data word, and once the count number reaches the current value of the pulse frame width, then the next pulse frame clock signal is generated.

In pulse width modulation, it is also possible that the subsequent data words can omit the synchronization pulse, in that the time duration of the current data word is also determined since the pulse width modulation respectively necessarily prescribes a defined signal level transition at the beginning of each data word. Thus, in each case, the current value of the pulse frame width is correspondingly adapted or matched to the preceding data word width i.e. to the corresponding determined counter-value, especially in the event of fluctuations in the oscillator frequency, if the determined value lies in an allowable value range. In this context, a data word that is affected by a frequency alteration is to be equated to a synchronization pulse. In certain cases the resulting loss of data information cannot be avoided, but instead can already be taken into account by the transmitter, in that non-critical information is transmitted during a frequency alteration.

The data acceptance clock signal may further be generated in a manner that is phase-shifted relative to the system clock signal, in that a data acceptance clock cycle counter is set to a value less than the current value of the system clock interval, and the counting of the oscillator cycles after the overflow is only begun upon reaching the next system clock signal.

In this context it is especially advantageous to carry out the sampling in the middle of the data pulse, in that the overflow end of the data acceptance clock cycle counter is set to the integer value closest to half of the current value of the system clock interval. This is advantageous because the influence of signal damping is at a minimum, while the signal level itself is at its strongest or most distinct level, in the middle of the data pulse. Generally, however, other sampling points within the data pulse may also be realized and utilized according to the invention, simply by using other corresponding values for the overflow end or limit.

A further alternative provides an even more advantageous method for carrying out the sampling. This alternative prescribes a sampling interval or time span, which is within the time duration of the system clock cycle, which is shorter than the respective current value of the system clock signal interval, and which comes into effect after a delay time based on a constant value or a defined fractional portion of the system clock signal interval. The signal level of each data pulse is sampled at least once within each sampling interval. This method, in a particular manner, uses the high oscillator frequency that is necessary for the already described methods of determining the clock frequency information and for generating the system clock signal, for achieving an oversampling of the signal level within a particular time window or interval. The sampling time window may, for example, be defined as consisting of a delay time at the beginning of a data pulse together with an immediately subsequent sampling time period, which is naturally shorter than the system clock signal interval.

If the signal level is to be over-sampled within or during this sampling time window, then the sampling time period should be selected to be a multiple of the oscillator cycle period. This is, of course, possible at any time as desired due to the required high oscillator frequency that has already been described. In this context, a sampling duration or interval of 50% and a delay time of 25% of the system clock signal spacing is preferred, whereby the sampling time window lies in the middle of the data pulse, and thereby is located away from and avoids the effects of irregular rising edges or flank transitions and transients occurring at the signal level transitions, for example due to the damping of high frequency components, and the effects of interference pulses, for example resulting from voltage spikes or the like in the power supply net, on the proper signal level recognition.

The over-sampling within the time window is preferably achieved by means of conjunctive combination of the data pulse level with the oscillator cycles over the duration of the sampling time interval. The over-sampling within the time window is especially advantageous also because it is well suited in the simplest possible manner, which will be described in greater detail below, for determining the PWM data word information.

As a first method for sampling the PWM values, it is possible to generate the data acceptance clock signal from the pulse frame clock signal. To achieve this, the invention provides an embodiment in which first a fixed signal level time duration is subtracted from the current pulse frame width, and then the result is divided by the number of the data pulses within the PWM word. The generation of the data acceptance clock signal is then once again carried out in a phase shifted manner, preferably in the middle of the data pulse. This is achieved in that first a data acceptance clock signal is generated with a time difference relative to the pulse frame clock signal, which is based on the first fixed signal level duration and on the desired position within the data pulse, for example 50% for the preferred centered sampling, and then this is repeated corresponding to the currently determined time duration of a data pulse by means of an overflow counter.

In this context it should be especially noted that the same basic concept and arrangement, namely a first counter for phase shifting and a second counter for pulse generation, can also be used, so that all possible signal forms can be processed by means of simple hardware based adaptations. Thus, for example, the particularly preferred method of over-sampling the signal level within a time window, whereby a sampling time duration is prescribed which is shorter than the currently calculated time duration of a data pulse and which comes into effect after a delay time based on a constant value or on a defined fractional portion of the currently calculated time duration of a data pulse, may also be utilized for PWM data words. For example, once again, after the first fixed signal level time duration, the desired phase shifting is first carried out in a first counter, and the sampling time duration or interval ($T_A$) is determined by means of a threshold value in a second counter that runs up to the determined value of the data pulse width, and the second counter is reset once it overflows. During the sampling time period, the signal level is once again conjunctively combined onto or with the oscillator cycle and the number of the sampling pulses is counted, and then the counted value is compared with the corresponding threshold value.

In a particular manner, a third variant embodiment according to the invention is suitable for sampling the PWM word, in that the over-sampling is not carried out relative to a bit-wise time window, but rather to a time window extending over the entire time duration of a PWM data word. In this method, beginning from a pulse frame clock signal, after a given time difference, which is for example equal to the first fixed signal level time duration, each oscillator cycle is conjunctively compared with the adjacent signal level during a PWM sampling time period, and the number of sampling pulses is counted. For evaluation purposes in this context, the sampling counter value is, however, compared to a number of thresholds, which are preferably defined as middle values between the nominal values of the possible signal levels. This method is particularly easily realizable, because it couples directly to the pulse frame clock signal and because it may be carried out using the same components.

As referred to above, the invention further provides a control system for transmitting digital data. According to the invention, a clock frequency information acquisition circuit is provided and is clocked or cycled by an oscillator. The clock frequency information is acquired with the cycling signal of the oscillator. This clock frequency information is then provided further to a data acceptance clock signal generator having a variable clock frequency. In turn, the data acceptance clock signal generator is clocked or cycled by the same oscillator, and generates a data acceptance clock signal. Due to the double or mutual common reference back to the cycling of the oscillator, errors resulting from the exchange or the deviation of the clock frequency of the oscillator are almost completely eliminated. The resulting relatively low requirements of long duration clocking accuracy of the oscillator are already sufficiently fulfilled by simple RC oscillators. The transmitter-side change or alteration of the clocking frequency by means of the clock frequency information as well as the adaptation for deviations of the oscillator frequency are carried out substantially or nearly identically on the receiver-side.

In a preferred further embodiment of the control system, the time duration of the synchronization pulse is first digitally acquired and determined as clock frequency information in the form of count values, and the respective count value is provided further to the data acceptance clock signal generator, which in turn once again comprises at least one counter that counts the number of oscillator cycles and then respectively generates a data acceptance clock signal upon reaching the count value, on the principle of an overflow counter.

Further according to a particularly preferred detailed embodiment of the control system, both the acquisition of the clock frequency information as well as the generation of the system and data acceptance clock signal are completely carried out by the digitally embodied basic concept of the invention comprising counters, comparators, and memory modules for the overflow threshold values. Thus, this embodiment can especially simply be realized through hardware as well as software implementations. Thus, each module comprises a first memory in which is respectively stored the count value determined by the clock frequency information acquisition circuit, and a second memory connected to the first memory through a numeric element. The numeric element is programmed to a particular divisor and/or a particular subtrahend of the stored value of the first memory, and the numeric element provides the corresponding value to be stored in the second memory. Analogously to the just described arrangement, a third memory is connected to the first memory through a second numeric element, whereby also this second numeric element is programmed to a certain divisor and/or subtrahend of the stored value of the first memory, and provides the corresponding value to be stored in the third memory.

A first counter, which is clocked by the same oscillator as the clock frequency information acquisition circuit, counts the number of oscillator cycles and then provides the corresponding counted value respectively to a comparator circuit, which compares the count value with the stored value of the first memory and then generates a system clock signal upon reaching the stored value. Furthermore, the counter value of the first counter is also compared, by a second comparator circuit, with the stored value that has been stored in the second memory, and once the count value reaches the stored value, a signal pulse is provided to the set input of a sampling window flip-flop. A second counter that is similarly clocked by the same oscillator and that is reset by the pulse output by the second comparator circuit, counts the number of oscillator cycles, and a third comparator circuit compares the counted value of the second counter to the stored value of the third memory, and then upon reaching the stored value, sends a signal pulse to the reset input of the sampling window flip-flop. For the time duration between the signal pulse provided to the set input and the signal pulse provided to the reset input, this sampling window flip-flop sends an output pulse of corresponding width to a data acceptance circuit and couples or combines the transmitted signal conjunctively with the oscillator cycle during this time period. This flip-flop comprises a counter that counts a number of oscillator cycles for which a certain or predetermined data signal level existed. Then, the count value is compared to at least one threshold by a comparator, and the data signal level is determined therefrom.

Through the suitable adaptation of the numeric elements as well as of the signal level comparators, this arrangement may be used to acquire and process both digital binary data as well as pulse width modulated data. In this context, it is significant that the acquisition of the clock frequency information, the generation of the system clock signal and the data acquisition clock signal, and the sampling of the signal level, all relate back to and are based on the same oscillator cycle frequency, which is higher than the clocking frequency. The generation of the sampling window and the over-sampling process within this time window is especially suitable for eliminating short high frequency interference signals, and may be surprisingly simply derived from or based on the oscillator cycle.

BRIEF DESCRIPTION OF THE DRAWINGS

In order that the invention may be clearly understood, it will now be described, by way of example, with reference to the accompanying drawings, wherein:

FIG. 10 is a time diagram representing the over-sampling, within a sampling time window, of a binary digital signal including irregularities or interference;

FIG. 11 is a time diagram representing the incrementing of the signal level value counter and derivation of the signal level value through a threshold value comparison with FIG. 10;

FIG. 12 is a time diagram representing over-sampling, within a sampling time window, of a pulse width modulated digital signal having irregularities or interference;

FIG. 13 is a time diagram representing the incrementing of the signal level value counter and derivation of the signal level value through a threshold value comparison with FIG. 12;

FIGS. 14a, 14b and 14c are sequence diagrams schematically representing data acceptance or transfer for undistorted recognition of the clock frequency information, and for faulty or noisy recognition of the clock frequency information, by means of stored auxiliary sampling frequency information in a normal operating mode; and FIG. 15 generally corresponds to a portion of FIGS. 14a, 14b, and 14c, and schematically represents the data acceptance or transfer in emergency operation, whereby the frequency corresponds to the auxiliary sampling frequency at both the transmitting end and the receiving end.

DETAILED DESCRIPTION OF PREFERRED EXAMPLE EMBODIMENTS AND OF THE BEST MODE OF THE INVENTION

The invention will now be described in greater detail in connection with the drawings and particular example embodiments. In the various block circuit diagrams and in the corresponding or related pulse timing diagrams for a given example embodiment, the structural components shown in the circuit diagrams as well as the corresponding or related values illustrated in the timing diagrams are labelled with the same reference numbers. Namely, a particular structural component as well as its related timing diagram value will have the same reference number. Furthermore, components having the same function in different example embodiments are generally labelled with the same reference number, but with a different prefix number which identifies the particular embodiment (e.g. 1.x, 2.x, 3.x).

Figure 1:
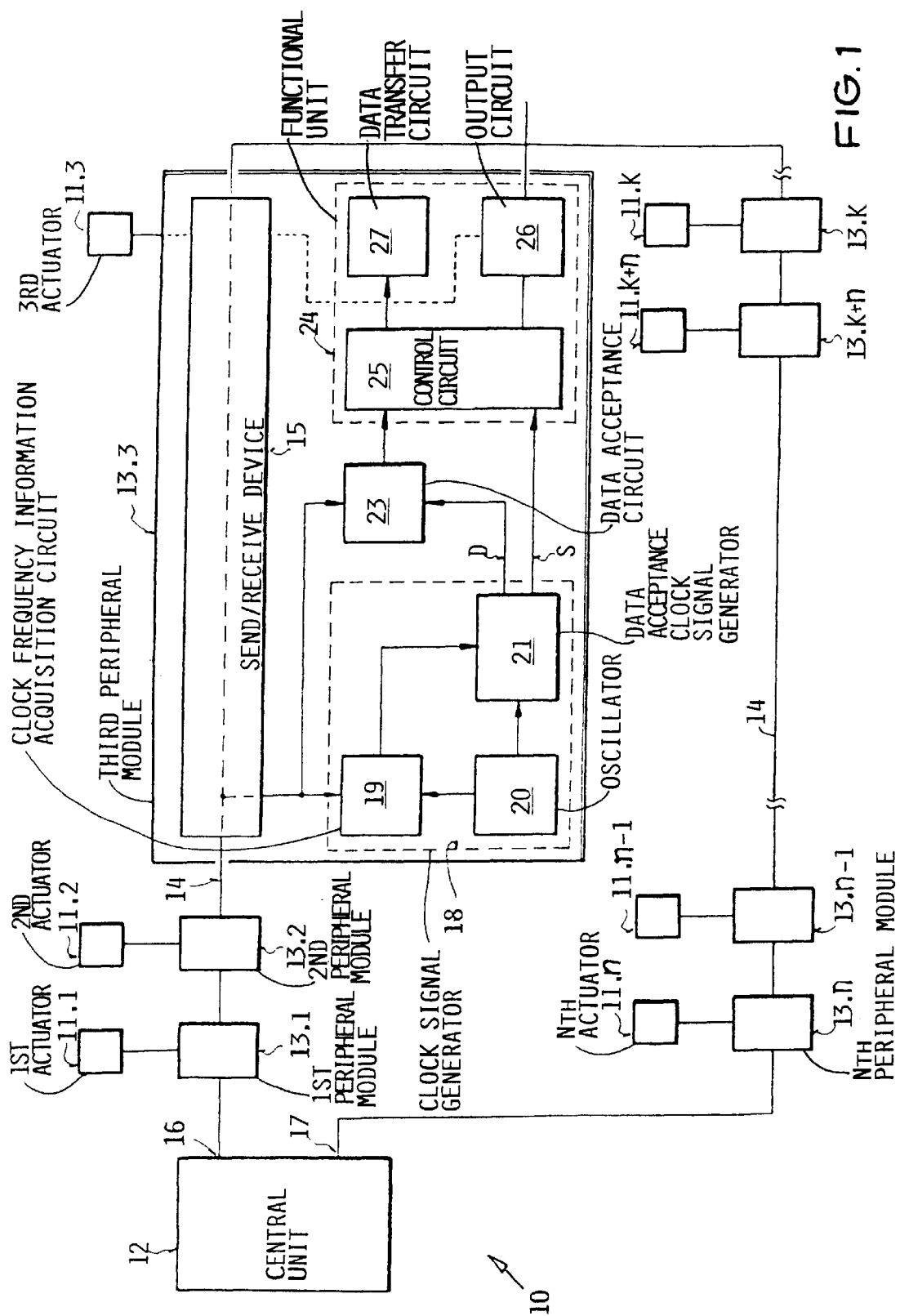
FIG. 1 is a simplified schematic block circuit diagram of a control system for transmitting digital data according to the invention.

The control system 10 schematically shown in FIG. 1 comprises a central unit 12 with a first input/output connection 16 and a second input/output connection 17. A ring-shaped bus line 14 connects peripheral modules 13 to the two input/output connections 16 and 17 in such a manner that the first peripheral module 13.1 is directly connected to the first input/output connection 16 and the $n^{th}$ module 13.n is directly connected to the second input/output connection 17, while the remaining peripheral modules 13.2 to 13.n-1 are connected to the bus line 14 between the first peripheral module 13.1 and the last or nt peripheral module 13.n, respectively in series between an adjacent preceding and an adjacent succeeding peripheral module.

A respective actuator 11.i is connected to and controlled by the respective peripheral modules 13.i. The actuators 11.i are, for example, triggering devices for the safety systems of a motor vehicle such as air bags, belt tensioners, roll-over bar deployment devices, and the like, or may be adjusting control members for individually controlling the braking pressure exerted in individual wheels of the vehicle in the context of an anti-lock braking system, or may be control units for the driving dynamics of the vehicle, and/or controllers for the damping characteristics of electro-hydraulic damper elements of an active chassis suspension system. The control system further includes sensors (not shown)

which sense various characteristics relating to the dynamic behavior of the vehicle and provide corresponding signals to the central unit 12, which then processes the output signals of the sensors to provide corresponding digital output signals relating to the dynamic behavior of the vehicle. The peripheral control modules 13 are connected to the central unit 12 for communication therewith via the bus line 14, so that the control modules 13 receive the digital output data of the central unit 12, and further process these information data in order to then provide the proper output control signals to the respective actuators 11.

In the present example embodiment, as mentioned above, the bus line 14 is arranged and embodied as a ring bus system in which the respective peripheral modules 13.i are sequentially arranged in series, so to speak, between the two data input/output connections 16 and 17 of the central unit 12 as described above. At each one of the connections or ports 16 and 17, the central unit 12 can transmit data and also receive certain data, such as, for example self-test data or status data that are transmitted by the peripheral modules 13.i. It should further be understood that an alternative embodiment (not shown for reasons of simplicity) is possible in which the bus line 14 is arranged as a star or spoke bus system, if the data input and output connections 16 and 17 of the central module 13 are bi-directional. A further possible bus arrangement is a simple linear bus.

FIG. 1 schematically shows the inner workings of peripheral module 13.3 as an example, while the other peripheral modules are merely shown as simple blocks. For example, the peripheral module 13.3 comprises a send/receive device 15 connected to the bus line 14, and also connected to a clock signal generator 18 and a data acceptance circuit 23. The peripheral module 13.3 further includes a functional unit 24 that cooperates with the send/receive device 15 and the data acceptance circuit 23 to receive and process digital data that have been transmitted by the central unit 12.

The functional unit 24 comprises a control circuit 25, which may for example be embodied as a microprocessor or the like, and an output circuit 26 connected to the control circuit 25. The output circuit 26 may, for example be a triggering circuit for a personal safety device such as an air bag in a safety system in a vehicle. The functional unit 24 further comprises a data transfer circuit 27 which serves to convey to the send/receive device 15 the data that are to be transmitted from the control circuit 25 to the central unit 12 or to the actuator 11.3. As shown by dotted lines within the send/receive device 15 in FIG. 1, the clock signal generator 18, the data acceptance circuit 23 and the data transfer circuit 27 may also be directly connected to the bus line 14.

The clock signal generator 18 comprises a clock frequency information acquisition circuit 19, having an input side that is connected to the send/receive device 15 or directly to the bus line 14. The clock signal generator 18 further comprises an oscillator 20 which is preferably an RC oscillator, namely an oscillator that comprises an oscillation circuit based on a resistor and a capacitor, as well as a data acceptance clock signal generator 21 that provides a system clock signal S to the functional unit 24 and a data acceptance clock signal D to the data acceptance circuit 23.

It is significant for the basic concept of the invention in this context, that both the clock frequency information acquisition circuit 19 and the data acceptance clock signal generator 21 access and rely on one and the same oscillator 20. It is exactly for this reason that any deviation of the oscillator frequency would not have any effect on the system clock frequency. This is achieved in that the clock frequency information acquisition circuit 19 acquires the clock frequency information with the aid of or in connection with the signal provided by the oscillator 20. Thus, if any error should happen to arise relative to a normalized rated value due to an instable operation of the oscillator, such error would be compensated in that the same error-containing oscillator signal would also be used for generating the data acceptance clock signal frequency.

Figure 2:
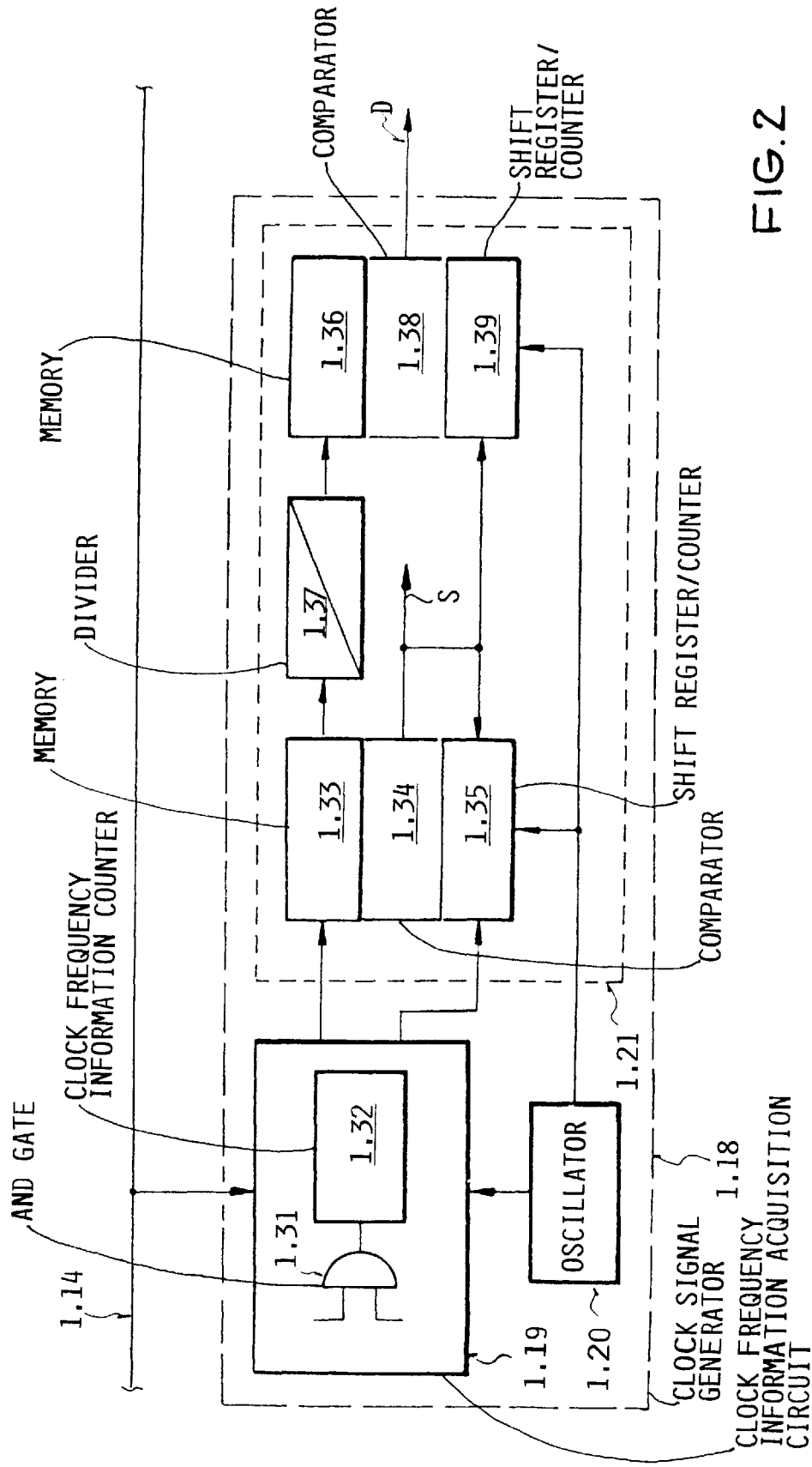
FIG. 2 is a simplified schematic block circuit diagram of a first embodiment of a clock signal generator for the control system of FIG. 1.

As shown purely schematically in FIG. 2, the clock frequency information acquisition circuit 1.19 (corresponding for example to the circuit 19 in FIG. 1) comprises a gate circuit 1.31, which is, for example, embodied as an AND-gate. At one of its two inputs, the AND-gate 1.31 receives the synchronization pulse train SW that represents the transmitting clock signal and that is transmitted by the central unit over the bus line 1.14. At the other one of its two inputs, the AND-gate 1.31 receives the oscillator clock signal generated by the oscillator 1.20. The output of the AND-gate 1.31 is connected to a clock frequency information counter or CFI-counter 1.32.

The data acceptance clock signal generator 1.21 comprises a bit duration ($T_B$) memory 1.33 for storing a CFI count value provided by the clock frequency information acquisition circuit. This CFI count value corresponds to the number of oscillator cycles that were counted during the duration of one synchronization pulse $SYN_i$. The bit duration or $T_B$ memory 1.33 is connected to a $T_B$ comparator 1.34, which in turn is connected to a shift register functioning as a $T_B$ counter 1.35 that is clocked by the oscillator 1.20. A retardation or delay time $T_R$ memory 1.36 is connected to the $T_B$ memory 1.33 via a $T_R$ divider 1.37, in order to store a $T_R$ count value which, for example corresponds to half of the CFI count value. A second comparator, namely a $T_R$ comparator 1.38 is connected on the one hand to the $T_R$ memory 1.36 and on the other hand to a shift register functioning as a $T_R$ counter 1.39, which is clocked by the oscillator 1.20. The output of the $T_B$ comparator 1.34 is connected to the reset inputs of the two counters 1.35 and 1.39.

The clock cycle generator 1.18 shown in FIG. 2 operates in the following manner for carrying out an example embodiment of the method according to the invention. As soon as the clock frequency information acquisition circuit 1.19 is released by a dead-time circuit which is not shown in detail, and the central unit has serially transmitted over the bus line 1.14 a synchronization pulse train or synchronizing word SW that indicates the transmitting clock signal and a data word DW, then the CFI counter 1.32 begins to count the oscillator cycles or beats of the oscillator 1.20 once it receives the first high state pulse. Namely, while a high input is applied to the first input of the AND gate 1.31 by the synchronization pulse SW, each high oscillator pulse applied to the second input of the AND gate 1.31 will result in a corresponding high output pulse from the AND gate which is passed on to and counted by the CFI counter 1.32. The count value that exists when the signal level of the pulse drops from high to low corresponds to the duration of the received pulse in reference to the actual current oscillator frequency of the oscillator 1.20. This count value can then be transferred to the $T_B$ memory 1.33 in order to derive therefrom a clock signal serving as the system clock signal S as well as a data acceptance clock signal D.

Preferably, the synchronization pulse train has a signal form with alternating signal levels, for example a synchronizing word comprising eight bits with the bit sequence 1-0-1-0-1-0-1-0 or H-L-H-L-H-L-H-L. In this manner, it is possible to redundantly or multiply detect and measure the duration of the individual high pulses (H), and therefrom to determine an averaged count value that indicates the pulse duration more exactly than any one of the individual count values respectively determined for the individual pulses, because the averaged count value is an average of all of the individually determined count values. The averaged count value is then stored in the $T_B$ memory 1.33, and as soon as this occurs, the clock frequency information acquisition circuit 1.19 in this example embodiment is blocked or deactivated by the dead time or lag time circuit, at least for the duration of the subsequent data word DW or a fixed, prescribed number of data words DW. As a further preferred feature, the clock frequency information acquisition circuit 1.19 will be blocked or deactivated even beyond the duration of the subsequent data word DW or the given number of subsequent data words DW, for a dead time $t_{dead}$, in order to ensure a data transfer free of interference. The count value stored in the $T_B$ memory 1.33 is divided, preferably by 2, by the $T_B$ divider 1.37, and the resulting value is stored in the $T_R$ memory 1.36. In order to generate the system clock signal S, the comparator 1.34 compares the content of the $T_B$ counter 1.35 with the count value stored in the $T_B$ memory 1.33. As soon as the number of oscillator cycles of the oscillator 1.20 as counted by the $T_B$ counter 1.35 corresponds to the count value stored in the $T_B$ memory 1.33, the comparator 1.34 will release a system clock signal S to the functional unit 1.24 of the peripheral module. This system clock signal S is simultaneously applied as a reset signal to the counters 1.35 and 1.39, so that the counting of the oscillator cycles will be reset and restarted from anew once a system clock signal S is released.

In order to generate the data acceptance clock signal D that is phase shifted relative to the system clock signal S, by means of the $T_R$ comparator 1.38, the comparator 1.38 compares the number of oscillator cycles counted by the $T_R$ counter 1.39 with the count value stored in the $T_R$ memory 1.36. Since the count value stored in the $T_R$ memory 1.36 is smaller or less than the count value stored in the $T_B$ memory 1.33 (for example half the latter value due to the operation of the $T_R$ divider 1.37 as described above), the $T_R$ counter 1.39 will reach the lower value stored in the $T_R$ memory 1.36 already before the end of, for example approximately half way into the duration of, a bit, so that the comparator 1.38 will release a data acceptance signal D approximately at the middle of the duration of a bit. However, the $T_R$ counter 1.39 will continue to count, and will only be reset when the system clock signal S arises, which respectively always corresponds to the beginning of a bit in the data word DW.

The data acceptance clock signal generator 1.18 will generate a system clock signal S corresponding to the transmitting clock signal of the central unit as determined by the clock frequency information in the last data transmission, until the time at which a subsequent data transmission is carried out by the central unit after release of the clock frequency information acquisition circuit 1.19.

Figure 3:
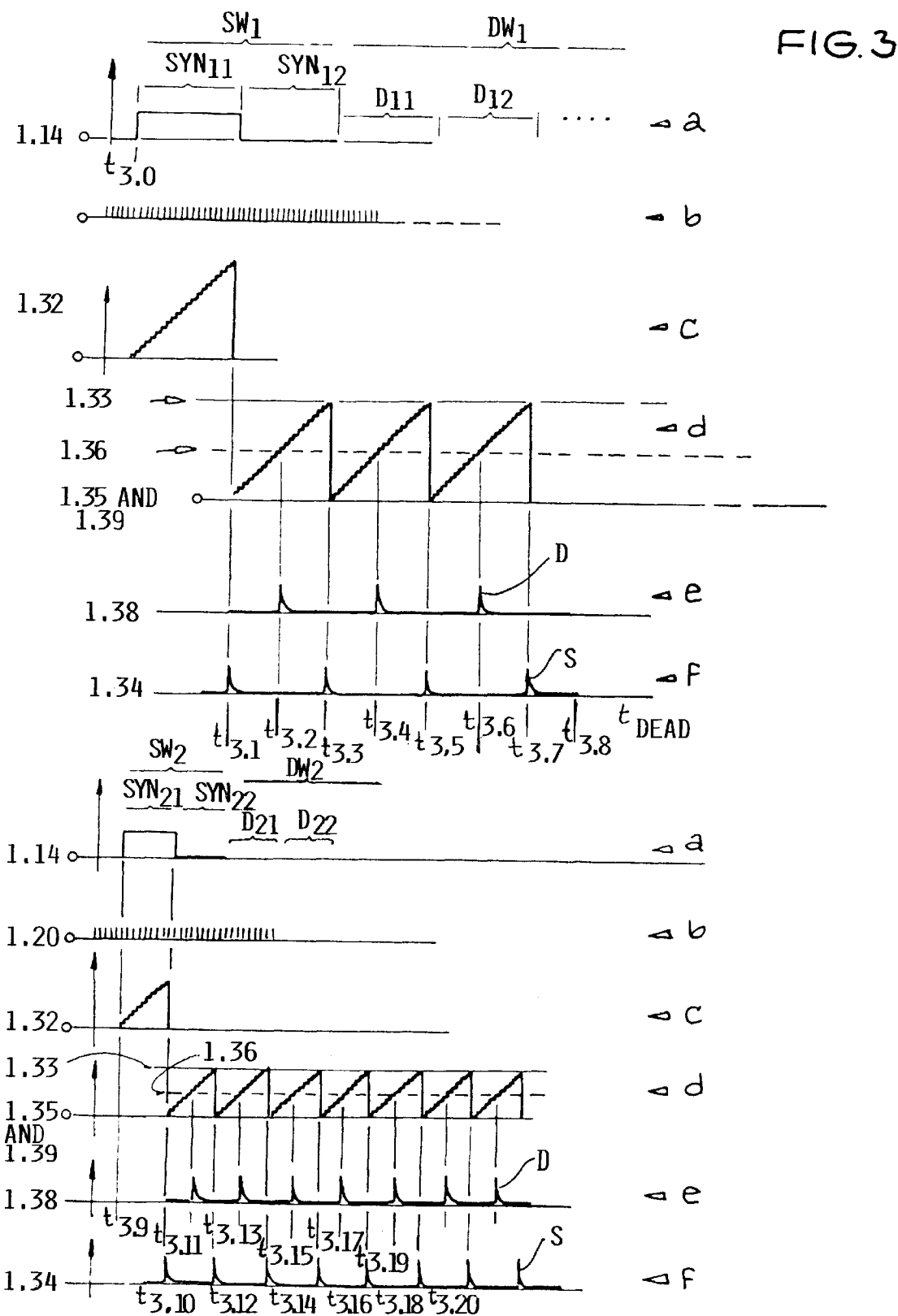
FIG. 3 is a pulse timing diagram for the clock signal generator of FIG. 2, which illustrates the time sequence or progression of various pertinent values.

FIG. 3 is a pulse timing diagram showing the time progression of all essential values relating to the clock signal generator 1.18 shown in FIG. 2. The various values are labelled with reference characters corresponding to the elements and functional blocks shown in FIG. 2. In other words, for example, FIG. 3A shows the time progression of the signal level on the busline 1.14, FIG. 3B shows the oscillator cycles or pulses of the oscillator 1.20, FIG. 3C shows the counting process in the CFI counter 1.32, FIG. 3D shows the count and comparison processes taking place within the data acceptance clock signal generator 1.21, FIG. 3E shows the data acceptance clock signal D output by the $T_R$ comparator 1.38, and FIG. 3F shows the system clock signal S output by the $T_B$ comparator 1.34.

A synchronization word $SW_1$ including two synchronization pulses $SYN_{11}$ and $SYN_{12}$, followed by a data word $DW_1$ including data pulses $D_{11}$, $D_{12}$, etc. is transmitted over the busline 1.14 as shown at the top of FIG. 3A. When the peripheral module receives the synchronizing signal pulse $SYN_{11}$ at a time $t_{3.0}$ after a prescribed dead time or lag time, or after the first time the power supply is connected, then the signal impulse $SYN_{11}$ is conveyed through the gate circuit 1.31 to the CFI counter 1.32. The two synchronization pulses $SYN_{11}$ and $SYN_{12}$ shown in FIG. 3A could alternatively be reversed in sequence, with regard to their respective signal levels, namely a low level synchronization pulse could precede a high level synchronization pulse, if the CFI counter 1.32, or more particularly the gate circuit 1.31 is embodied to correspondingly react to the rising or falling flanks or pulse edges, or the selected signal level value, of the synchronizing signal.

The CFI counter 1.32, as shown in FIG. 3C, is reset to zero in a defined manner, and then counts the number of oscillator cycles or pulses shown in FIG. 3B, until the time $t_{3.1}$, at which the end edge or flank of the first synchronization pulse $SYN_{11}$ drops off. The count value present in the CFI counter 1.32 at time $t_{3.1}$ is, if desired, first compared to acceptable value ranges and then stored as a memory threshold value in the $T_B$ memory 1.33, as depicted in FIG. 3D. Parallel to this procedure, the determined count value is also divided in the $T_R$ divider 1.37, and the resulting value is stored as a second threshold value in the $T_R$ memory 1.36.

The two counters 1.35 and 1.39 are reset at time $t_{3.1}$ and from there on they count the oscillator cycles or pulses. At time $t_{3.2}$ the $T_R$ counter 1.39 reaches the threshold value prescribed in the $T_R$ memory 1.36 so that the comparator 1.38 generates and releases a data acceptance clock signal D as shown in FIG. 3E. At time $t_{3.3}$, the counter 1.35 reaches the threshold value stored in the $T_B$ memory 1.33, so that the comparator 1.34 generates and releases a system clock signal S as shown in FIG. 3F, whereupon also both counters 1.35 and 1.39 are reset to zero.

At the time $t_{3.3}$, once again the counting of the oscillator cycles or pulses begins and the count values in the counters 1.35 and 1.39 are increased accordingly, and the count values are respectively compared by means of the comparators 1.34 and 1.38 to the prescribed threshold values stored in the memories 1.33 and 1.36. Once the threshold values are reached, the system clock signal S and the data acceptance clock signal D are generated as a result, respectively, as described above.

The signal levels of the data pulses $D_{11}$, $D_{12}$, etc. represent or carry the information to be transmitted in the control circuit 1.25 or the output circuit 1.26. The signal levels of the data pulses in this context are respectively sampled approximately at the mid-points thereof, i.e. approximately halfway through the duration of the respective data pulse, by means of the data acceptance signal D shown in FIG. 3E. At the end of the first data word $DW_1$, a dead time or lag time will be carried out.

After the dead time or lag time, at the time point $t_{3.9}$, a new synchronization pulse train $SW_2$ is received. However, the respective duration of the synchronization pulses $SYN_{21}$ and $SYN_{22}$ is different from the duration of the pulses of the first synchronizing pulse train $SW_1$ described above. Nonetheless, in an identical manner as described above, and as shown in the continuation of FIG. 3C, the current length of the synchronization pulse $SYN_21$ is determined by the CFR counter 1.32 by counting the respective oscillator pulses. Then, as shown in the continuation of FIG. 3D, the threshold levels in the memories 1.33 and 1.36 are adapted or updated based on the current actual new synchronization pulses $SYN_{21}$ and $SYN_{22}$. The counters 1.35 and 1.39 are reset and once again count the number of oscillator pulses until reaching the corresponding threshold values, whereupon the system clock signal S and the data acceptance clock signal D are correspondingly respectively released by the comparators 1.34 and 1.38 as shown in FIGS. 3F and 3E respectively.

In this context it is significant to note that the clocking frequency of the data acceptance clock signal D as shown in the continuation of FIG. 3E has been shifted to adapt or correspond to the new, shorter synchronization pulse train $SW_2$ as compared to the above described operation in relation to the longer synchronization pulse train $SW_1$. In this context, the matching or adaptation of the transmitting frequency is simply subject to limitations in the embodiment of dimensioning of the counters 1.32, 1.35, and 1.39, which may, of course, however, be designed and embodied to meet the requirements in any given situation. Moreover, when the transmitting clock frequency is increased, the relative error resulting from quantization by means of the oscillator pulse signal will also correspondingly increase, so that it is recommendable to use an oscillator having a correspondingly high or increased frequency. In general, however, FIG. 3 illustrates that it is possible to match or adapt the receiver to the transmitter frequency, using simple means, over a broad frequency range.

Figure 4:
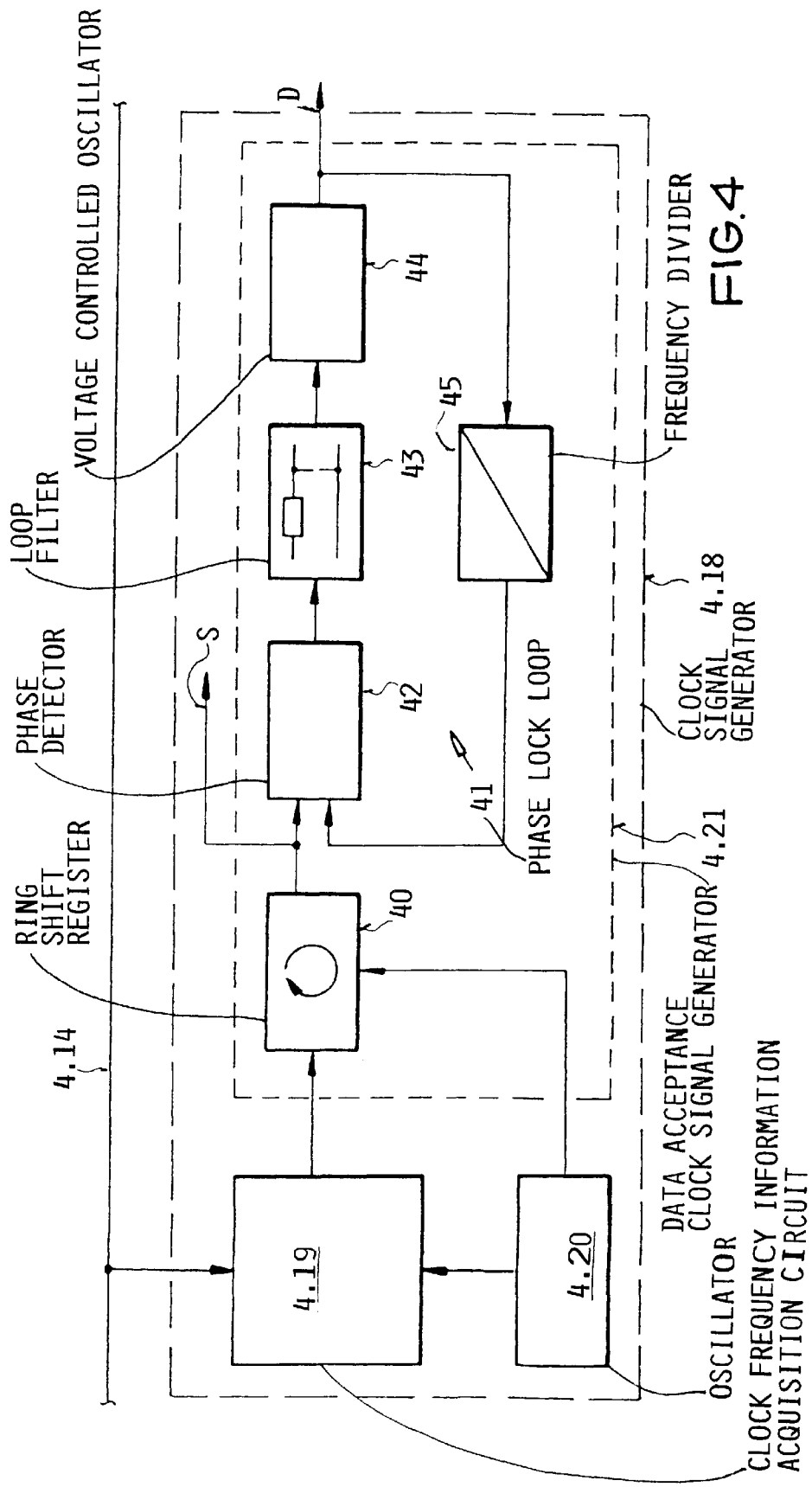
FIG. 4 is a simplified schematic block circuit diagram of a further embodiment of a clock signal generator.

FIG. 4 shows another embodiment of a clock signal generator 4.18, which can similarly be used for carrying out the method according to the invention. This clock signal generator 4.18 once again comprises a clock frequency information acquisition circuit 4.19, which receives as a first input the pulses of a pulse train indicative of the transmitting clock signal, and especially the individual bits of a synchronizing word SW, and receives as a second input the output signal of an oscillator 4.20. The clock frequency information acquisition circuit 4.19 determines a count value that corresponds to the duration of a bit by indicating how many oscillator cycles or pulses correspond to the duration of such a bit, in a manner as already described with reference to FIG. 2. This count value is provided to a ring shift register 40 with a variable end point, in order to adjust or set the variable end point of this register. In order to generate the system clock signal S, this ring shift register 40 is clocked by the oscillator 4.20, such that a system clock signal S is released respectively each time after the expiration of the duration of a pulse or bit.

In order to generate a data acceptance clock signal D, the present circuit includes a phase control loop or phase lock loop 41 with a phase detector 42, a loop filter 43, and a voltage controlled oscillator (VCO) 44. The output signal of the voltage controlled oscillator 44 serves as the data acceptance clock signal D and is accordingly provided to the data acceptance circuit 4.23, and is connected through a feedback loop to an input of the phase detector 42. In this context, the feedback connection from the voltage controlled oscillator 44 to the phase detector 42 may include a frequency divider 45.

Thus, the present embodiment of a clock signal generator 4.18 uses analog components to generate the system clock signal S from a ring shift register that has a variable end point and that is clocked by the oscillator 4.20, so as to correspondingly set a count value that corresponds to the duration of a bit. In order to generate the data acceptance clock signal D, the system clock signal S is phase shifted using a phase lock loop 41 in such a manner that the data acceptance or sampling takes place approximately in the middle of a bit.

According to the method of the invention, for and during each data transmission from the central unit to a peripheral module, the clock signal generator 4.18 is synchronized with the transmitting clock signal of the central unit. In this manner, drift over long periods of time, as well as temperature and age-induced variations of the oscillator frequency can be compensated for. It is most advantageous if the oscillator 4.20 oscillates at a frequency equal to a multiple in the range of 50 times to 200 times the normal transmitting clock frequency.

Figure 5:
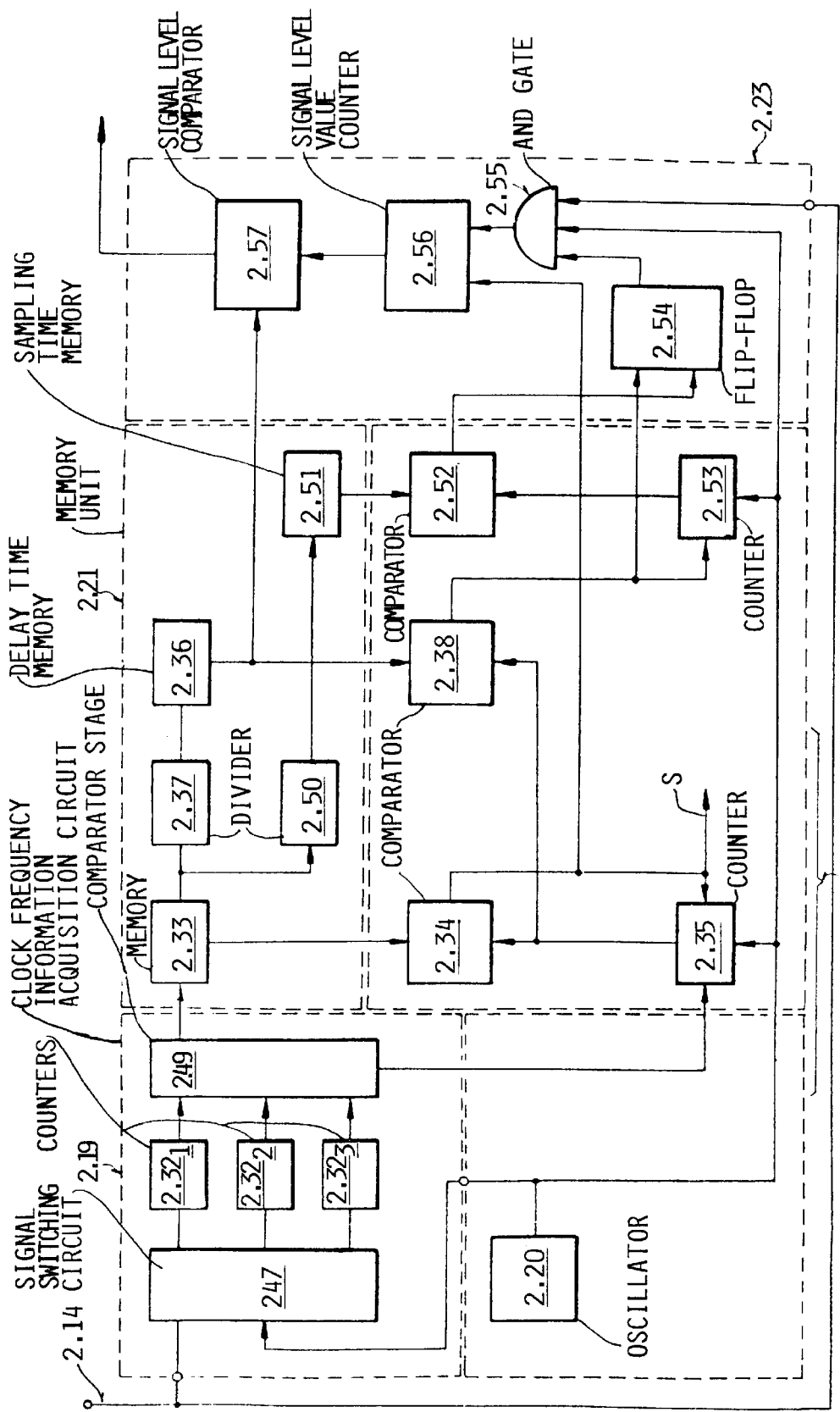
FIG. 5 is a simplified schematic block circuit diagram of a further example embodiment of a clock signal generator and of a data acceptance circuit of the control module of the control system according to FIG. 1.

FIG. 5 shows a second example embodiment which is an especially preferred embodiment of the invention. As an input stage, the clock signal generator 2.18 once again includes a CFI acquisition circuit 2.19 to which the data are provided through a data input of the clock signal generator 2.18, and to which the oscillator cycle signals or pulses of an oscillator 2.20 are provided through a reference input. The cycle or pulse period $T_O$ of the oscillator 2.20 is substantially shorter than the bit duration $T_B$ of the bit pulses of the data, and in a typical embodiment of the present oscillator, the pulse period $T_O$ amounts to approximately 1/100 of the shortest possible bit duration with which the data blocks are transmitted.

In this second example embodiment, the CFI acquisition circuit 2.19 comprises three CFI counters 2.32$_1$, 2.32$_2$, and 2.32$_3$, having counter inputs that are individually or singly connected to respective associated pulse outputs of a signal switching circuit 2.47, which in turn forms the input stage of the CFI acquisition circuit 2.19. With further reference to the signal timing diagrams of FIG. 6, the signal switching circuit 2.47 is controlled by the rising flank or pulse edge at time $t_{6.0}$ of the first high level pulse $T_{B1}$ of the synchronization word, the falling flank at time $t_{6.1}$ of the first high level pulse $T_{B1}$, as well as the rising flank at time $t_{6.2}$ and the falling flank at time $t_{6.3}$ of the second high level pulse $T_{B3}$ of the synchronization word, in the manner of a sequence control, so that the signal switching circuit 2.47 carries out the following functions:

For the time duration $T_{B1}$ of the first high level pulse of the synchronization word SW, the number of output pulses of the oscillator 2.20 occurring during this time span is counted in the CFI counter 2.32$_1$ as shown especially in FIG. 6C. Then, the count value reached at time $t_{6.1}$ is input to and stored in a comparator stage 2.49. For the duration $T_{B2}$ of the next successive low level bit signal of the synchronization word SW, the output pulses of the oscillator 2.20 are counted by the second CFI counter 2.322, and once again the count value reached at time $t_{6.2}$ is input into the comparator stage 2.49. In a similar manner, the output pulses of the oscillator 2.20 occurring during the bit duration $T_{B3}$ of the second high level pulse are counted by the third CFI counter 2.32$_3$, and the final count value reached at the time $t_{6.3}$ is input into the comparator stage 2.49.

Then, the comparator stage 2.49 compares the respective final count values of the counters 2.32$_1$, 2.32$_2$, and 2.32$_3$ based on plausibility or reasonability criteria, and as a result forms a "most probable" count value representing the bit duration $T_B$ in units of the period duration $T_O$ of the output pulses of the comparison oscillator 2.20. In an advantageous embodiment of the comparator stage 2.49, it will form or generate the "most probable" count value representing the bit duration $T_B$ as an average value of the respective three count values provided by the counters $2.32_1$, $2.32_2$, and $2.32_3$, if the scattering or variance among the three values is relatively small. However, if the comparison carried out by the comparator stage 2.49 determines that two of the three count values are identical or only slightly different from one another, while the third count value deviates substantially from the two similar or identical values, then the comparator stage 2.49 interprets this situation that the deviating count value is erroneous or subject to interference and so the comparator stage 2.49 forms the resultant "most probable" or comparative count value as an average value of the two identical or similar input count values while ignoring the deviating count value.

It should also be understood that by using an inverting logic element or circuit, it is also possible to determine the bit duration respectively during a low level pulse, or especially without waiting or lag times, if both the low level pulses as well as the high level pulses are evaluated.

With particular reference again to FIGS. 5 and 6, at time $t_{6.3}$, the $T_B$ reference value representing the bit duration $T_B$ is input into a $T_B$ memory 2.33 of a memory unit 2.21, which comprises as further memory elements a delay time ($T_R$) memory 2.36 and a sampling time ($T_A$) memory 2.51. The value or content of the $T_R$ memory 2.36 is derived from the memory content of the $T_B$ memory 2.33 through a $T_R$ divider 2.37, and thus represents a delay time span $T_R$ of 25% of the bit duration $T_B$. Similarly, the memory content or value of the $T_A$ memory 2.51 is derived from the content of the $T_B$ memory 2.33 through a $T_A$ divider 2.50, but so as to represent a sampling time span $T_A$ of 50% of the bit duration $T_B$. These time span values $T_R$ and $T_A$ are represented or illustrated in FIGS. 6D and 6G as threshold values corresponding to the memories 2.36 and 2.51.

Furthermore, the clock signal generator 2.18 comprises a $T_B$ counter 2.35 and a $T_A$ counter 2.53, which each permanently receive, as counting pulses, the output pulses of the oscillator 2.20, as this has similarly been described with reference to the first example embodiment. After receiving the third synchronization pulse, the counters 2.35 and 2.53 are reset, for example in that a connector line between the comparator stage 2.49 and the $T_B$ counter 2.35 provides a reset signal, as shown in FIG. 5. However, it is generally also possible within the scope of the invention that all elements of the clock signal generator 2.18 receive a common or global system reset signal via a system reset line which is not shown, before the new values are transmitted, since such a system reset line is typically provided anyway in the presently discussed systems.

As represented in FIG. 6D, the increasing count value of the $T_B$ counter 2.35 is, on the one hand, continuously compared by means of the $T_B$ comparator 2.34 with the count value or threshold value 2.33 characteristic of the bit duration which is stored in the $T_B$ memory 2.33. In this context, once the actual count value in the $T_B$ counter 2.35 reaches the stored reference value of the $T_B$ memory 2.33, the $T_B$ comparator 2.34 releases a system clock signal pulse S of short duration, as shown in FIG. 6E. The time interval spacing of the system clock signal pulses thereby corresponds respectively to the most recent acceptable pulse duration $T_B$ or a prescribed auxiliary value of which the function will be described in greater detail below. Furthermore, the $T_B$ counter 2.35 is respectively reset by each one of these system clock signal pulses S of the $T_B$ comparator 2.34.

Furthermore, the increasing count value of the first counter 2.35 is continuously compared by a $T_R$ comparator 2.38 with the content of the $T_R$ memory 2.36, represented as threshold value 2.36 in FIG. 6D. Whenever the increasing count value of the first $T_B$ counter 2.35 reaches or equals the threshold level represented by the stored value of the $T_R$ memory 2.36, the $T_R$ comparator 2.38 generates or releases a short duration pulse that is used as a reset pulse for the $T_A$ counter 2.53, as shown in FIG. 6F and in FIG. 5. By comparing the time progression of the count value of the $T_B$ counter 2.35 as shown in FIG. 6D with the time progression of the count value of the $T_A$ counter 2.53 as shown in FIG. 6G, it is clearly apparent that the latter replicates or follows after the former with a delay or shift of ¼ of the bit duration $T_B$.

Still further, the clock signal generator 2.18 comprises a sampling time $T_A$ comparator 2.52, which carries out a comparison of the count value of the $T_A$ counter 2.53 with the stored value of $T_A$ memory 2.51. The $T_A$ comparator 2.52 then outputs or releases a short duration output pulse, in a time sequence as shown in FIG. 6H, respectively at each time point when the count value of the $T_A$ counter 2.53 reaches the count value or theshold stored in the $T_A$ memory 2.51, which corresponds to 50% of the bit duration $T_B$ in the second illustrated example embodiment.

The data acceptance circuit 2.23 shown in FIG. 5 comprises a flip-flop 2.54 as a bi-stable flip-flop stage, which is set to a high output signal level by the output pulses provided from the $T_R$ comparator 2.38 to a set input of the flip-flop 2.54. Furthermore, the flip-flop 2.54 is resettable to a low output signal level by the output pulses of the $T_A$ comparator 2.52 which are provided to the reset input of the flip-flop 2.54. Thus, the output signal of the flip-flop 2.54 is a sequence or succession is of high level pulses respectively having a pulse duration $T_A$ corresponding to the sampling time span, which is equal to half of the bit duration $T_B$ in the second example embodiment. The time progression of the high level output pulses of the flip-flop 2.54 are shown qualitatively in FIG. 6I, from which it is apparent that the high level output pulses are initiated or activated at 25% of the bit duration $T_B$ and thereafter are deactivated or decay at 75% of the bit duration $T_B$.

The data acceptance circuit 2.23 further comprises a three input AND-gate 2.55, which outputs a high level signal when each of the three inputs receives a high level signal. The first input of this AND-gate 2.55 is connected to the output of the flip-flop 2.54. The second input receives the cycle or pulse signal of the oscillator 2.20. The third input of the AND-gate 2.55 is connected to the data input through which the respective data blocks are provided to the respective peripheral module, in other words, the third input is ultimately connected to the data bus 2.14, for example through a send/receive device 2.15.

The output of the AND-gate 2.55 is connected to a counting input of a signal level value counter 2.56, which further has a reset input connected to the output of the $T_B$ comparator 2.34 such that the system clock signal pulse S resets the counter 2.56. With the present circuit arrangement, the output of the AND-gate 2.55 represents a conjunctive combination of the data transmitted by the central unit, together with the output pulses of the oscillator 2.20, and further together with the output signals of the flip-flop 2.54. In this manner, the output signal of the AND-gate 2.55 ensures that the counter 2.56 of the data acceptance circuit 2.23 only receives count pulses when a high signal of a data pulse is present and only during the respective sampling interval of duration $T_A$, except for any possible instability of the circuit arrangement as a whole and/or control pulses of which the number can be regarded as significantly smaller than the number of the output pulses of the reference oscillator 2.20. An over-sampling is carried out within a time window as will be shown in detail in FIG. 13 and as will be described below. Thus, the count value after expiration of the sampling interval $T_A$ is a measure for the signal level, high or low, of the bit signal of the data pulses.

In the second example embodiment, the above described circuit arrangement ensures, under the assumed requirement of a stable and interference-free operation, that the maximum count value of the signal level value counter 2.56 corresponds to half of the value of the content of the $T_B$ reference value memory 2.33, if the bit signal being processed was a high signal, and a count value of 0 corresponds to a low signal. The time progression of the output or count value of the signal level value counter 2.56 is shown qualitatively in FIG. 6J.

The data acceptance circuit 2.23 further comprises a signal level comparator 2.57 connected to the output of the signal level value counter 2.56 for the further evaluation processing of the count value output of the counter 2.56. More specifically, upon or after expiration of the sampling interval $T_A$, the comparator 2.57 compares the count value output of the counter 2.56 with a threshold value which is lower than the maximum reachable count value. For example, the threshold value is provided by the output delay or retardation time signal $T_R$ of the delay memory 2.36. Then, the comparator 2.57, controlled by the system clock signal S, respectively outputs a high signal for the duration $T_B$ when the signal of the provided data pulse that is being processed was a high signal, or alternatively the comparator 2.57 outputs a low signal corresponding to low signals of the respective data pulse. FIG. 6K qualitatively shows the time progression of the data signal that is output by the signal level comparator 2.57 and that is taken over for further processing in the respective actuator control module 2.13. It is clearly evident in FIG. 6K, for example in comparison to FIG. 6A, that the acceptance, processing and further transmission of the data signal in the respective control module 2.13 leads to a delay or retardation of the signal respectively by a bit duration $T_B$ relative to the received data pulses.

In order to achieve the maximum possible signal-to-noise ratio and thereby achieve a maximum possible security against erroneous determinations by the signal level comparator 2.57, the threshold value above which the comparator 2.57 evaluates the count value as a high signal and correspondingly outputs a high signal is selected to be 50% of the highest possible count value without interference pulses of the counter 2.56. Thus, in the presently described example embodiment, the threshold value corresponds to the stored content of the $T_R$ memory 2.36, so that the output of the memory 2.36 can also be used to provide the comparison threshold value with which the signal level comparator 2.57 compares the count value of the counter 2.56.

In a typical layout and design of the control system 2.10, its central unit 2.12 operates with transmitting clock signals having bit durations $T_B$ between $4 \times 10^{-6}$ seconds and $2 \times 10^{-5}$ seconds, while the reference or comparison oscillators 2.20 of the respective control modules 2.13 are designed to operate at a frequency of about $2.5 \times 10^{-7}$ seconds.

Figure 6:
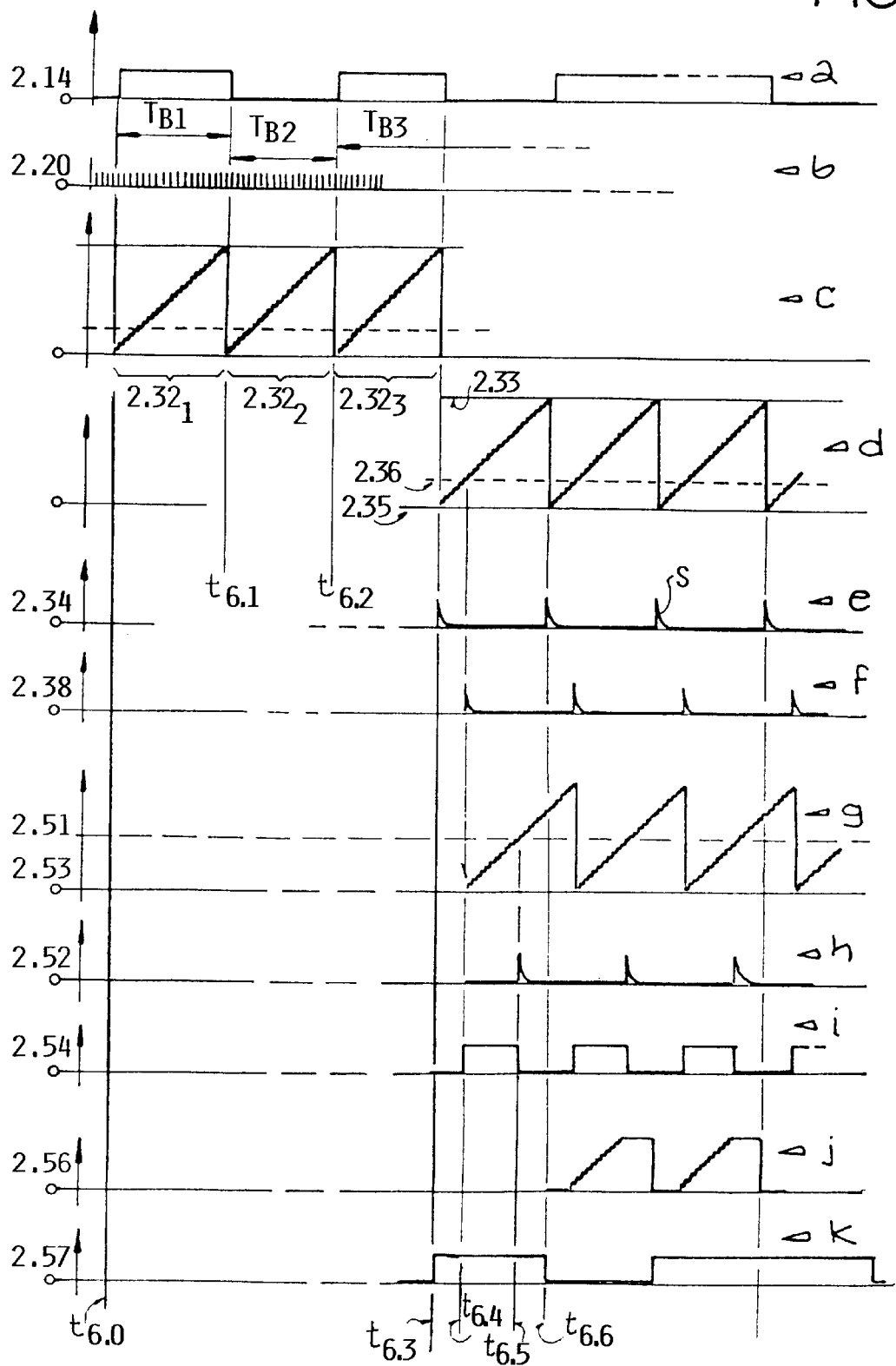
FIG. 6 is a pulse timing diagram for explaining the function of the clock signal generator and the data acceptance circuit of FIG. 6.
Figure 7:
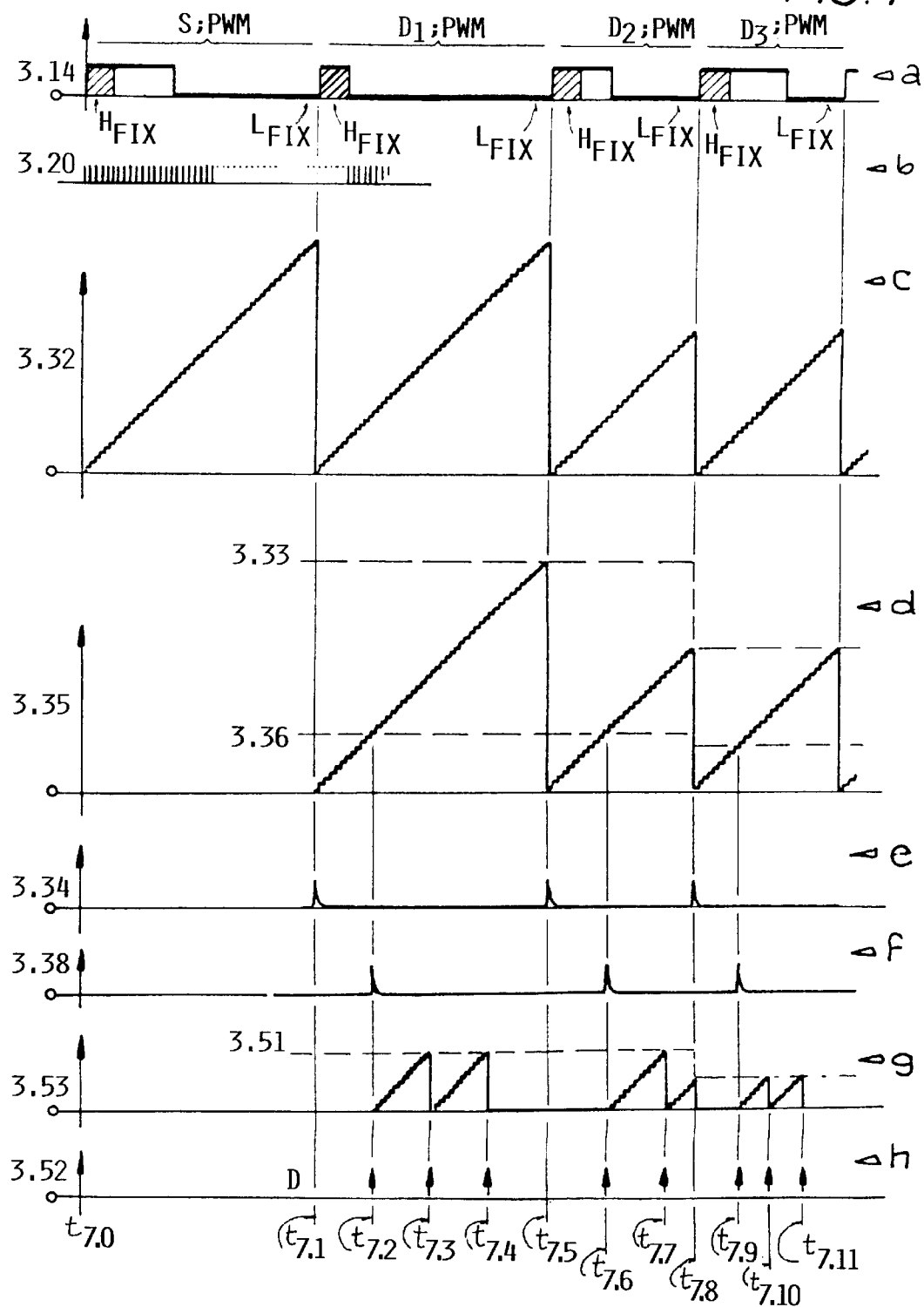
FIG. 7 is a pulse timing diagram for explaining the function of the clock signal generator of FIG. 2 for transmitting pulse width modulated signals.

While the pulse timing diagram of FIG. 6 has already been discussed in connection with the circuit of FIG. 5, FIG. 7 will now be discussed also in connection with the circuit of FIG. 5. Namely, FIG. 7 shows a pulse timing diagram of the time progression of the most important signal values that arise for activating or operating the clock signal generator according to FIG. 5 with pulse width modulation (PWM) signals. In the present context of the third example embodiment, the reference numbers shown in FIG. 5 are modified by changing the prefix from "2." to "3.". Thus, the clock signal generator 3.18 comprises a CFI counter 3.32 that is clocked by an oscillator 3.20 and that determines the duration of a synchronization pulse ($S_{PWM}$) In this context, the CFI counter 3.32, depending on and corresponding to the form of the PWM signals, respectively only reacts to one pulse flank or edge slope type, for example in this embodiment only reacts to the rising flank or edge slope of the PWM signals at $t_{7,0}$ and $t_{7,1}$.

The PWM signal shown in FIG. 7A comprises, for synchronization pulses and data pulses, a first fixed signal level duration $H_{fix}$ and a second fixed signal level duration $L_{fix}$ at the end of the PWM word, respectively corresponding to the two opposite signal levels. Thus, independent of the logic or informational content of the PWM signal, a respective signal level alternation will necessarily occur, for example as shown at time $t_{7,1}$ in FIG. 7A. In other words, each PWM word will always include a high signal pulse at the beginning of the word for at least the duration $H_{fix}$, and will always include a low signal level or pulse at the end of the word for a time of $L_{fix}$.

After the duration of the synchronization pulse word $S_{PWM}$ is detected, at time point $t_{7,1}$, the current count value of the oscillator cycles that have been reached in the counter 3.32 is transferred to the comparator stage 3.49 and then counter 3.32 is reset, as shown in FIGS. 7A, 7B, and 7C. Simultaneously, the comparator stage 3.49 tests the acceptability of the determined count value, and if the value is acceptable, it passes the value on to the $T_B$ memory 3.33. The value is then divided in the dividers 3.37 and 3.50, and the resultant divided values are respectively stored in the memories 3.36 and 3.51. It is thus apparent that the memory unit in the present case has the same construction or arrangement as the memory unit according to FIG. 5.

However, a difference between the embodiment described in connection with FIG. 5 and the present embodiment is that the dividers 3.37 and 3.50 carry out a different numerical operation than the corresponding dividers 2.37 and 2.50 in FIG. 5. Namely, the $T_R$ divider 3.37 first subtracts the two permanent prescribed fixed signal level duration values from the pulse frame count value stored in the $T_B$ memory 3.33, and then divides the result by 6, whereby the quotient 6 gives exactly one half of a data pulse of the three bit PWM data word. The numerical operation carried out by the $T_A$ divider 3.50 similarly begins by subtracting the permanently prescribed fixed signal level duration values, and then continues by dividing the result by 3, corresponding to the bit count of the PWM word. Thus, once again, the value that is passed on and stored in the $T_R$ memory 3.36 is a delay or retardation time corresponding to the middle of the first data pulse, and the value passed on and stored in the $T_A$ memory 3.51 corresponds to the time duration of a data pulse.

Upon releasing a new value to the memory 2.33, the comparator stage 3.49 triggers a system reset signal for the counters 3.35 and 3.53. Now the $T_B$ counter 3.35 will once again begin to count the oscillator cycles or pulses, as shown in FIG. 7D, and at the time $t_{7,2}$ thereby reaches a count value corresponding or equal to the threshold value stored in the $T_R$ memory 3.36, as determined by the $T_R$ comparator 3.38, whereupon the $T_R$ comparator 3.38 releases a clock signal to the $T_A$ counter 3.53 as shown in the FIG. 7F. In turn, the counter 3.53 is thereby reset, and thereupon begins to once again count the number of oscillator cycles or pulses until its count value reaches the threshold value stored in the $T_A$ memory 3.51 as shown in FIG. 7G. At that time, the $T_A$ comparator 3.52 triggers a data acceptance clock signal D as shown in FIGS. 7G and 7H, by which the following data acceptance circuit is clocked, and simultaneously the counter 3.53 is reset. This sequence of events is repeated a number of times corresponding to the number of the data pulses in the PWM word. At time $t_{7.5}$ the $T_B$ counter 3.35 as shown in FIG. 7D reaches the threshold value stored in the $T_B$ memory 3.33, so that the $T_B$ comparator 3.34 outputs a signal that sets the pulse frame clocking as shown in FIG. 7E.

As shown in FIG. 7, if at time $t_{7.5}$ the transmission clock frequency is increased and a data word $D_2PWM$ is transmitted with a shortened data pulse duration, the present circuit arrangement operates as follows. Once again, the counter 3.32 determines the duration of the actual current data pulse. Meanwhile, the counter 3.35 continues to run according to the old or previous pulse frame duration stored in the memory 3.33. Also the threshold value stored in the $T_R$ memory 3.36 is still based on the old or previous pulse frame spacing or duration interval, so that the counter 3.53 will be activated or started at the time $t_{7.6}$ as shown in FIG. 7G. However, at time $t_{7.8}$, the counter 3.32 reaches the end of the PWM data word $D_2PWM$, and passes the counted time duration onto the comparator stage 3.49, which thereupon resets the counters 3.35 and 3.53 and provides the new threshold values to be stored in the memory 3.33, as well as the memories 3.36 and 3.51 after carrying out the numeric operations in the dividers 3.37 and 3.50. Thus, the data word $D_3PWM$ may now once again be exactly sampled. At time $t_{7.9}$, the $T_B$ counter 3.35 reaches the new threshold value that is based on the new pulse spacing and is stored in the $T_R$ memory 3.36, as determined in the $T_R$ comparator 3.38, of which the output clocking signal will in turn activate the $T_R$ counter 3.53, as shown in FIG. 7G. At time $t_{7.10}$, the $T_R$ counter 3.53 reaches the threshold value stored in the $T_A$ memory 3.51, which has similarly been adapted to the new pulse frame spacing, so that the time spacing of the data acceptance clock signals D shown in FIG. 7H has also been adapted to the new pulse frame spacing.

As can especially be seen from FIG. 7, it is possible to switch to a shorter pulse frame duration and thereby to increase the data transmission frequency, while losing only a single data pulse, which may also be regarded as a synchronization pulse. Thus, the first data pulse following a switch in the pulse train duration or data transmission frequency preferably carries information that is redundant, non-necessary, or inconsequential. The present method is also based on the basic concept and circuit arrangement shown and described with reference to FIG. 5. Simply the dividers 3.37 and 3.50 must be differently programmed or embodied to carry out different numeric operations, and instead of the flip-flop 3.54, the output signal of the $T_A$ comparator 3.52 is used as the data acceptance clock signal D.

Figure 8:
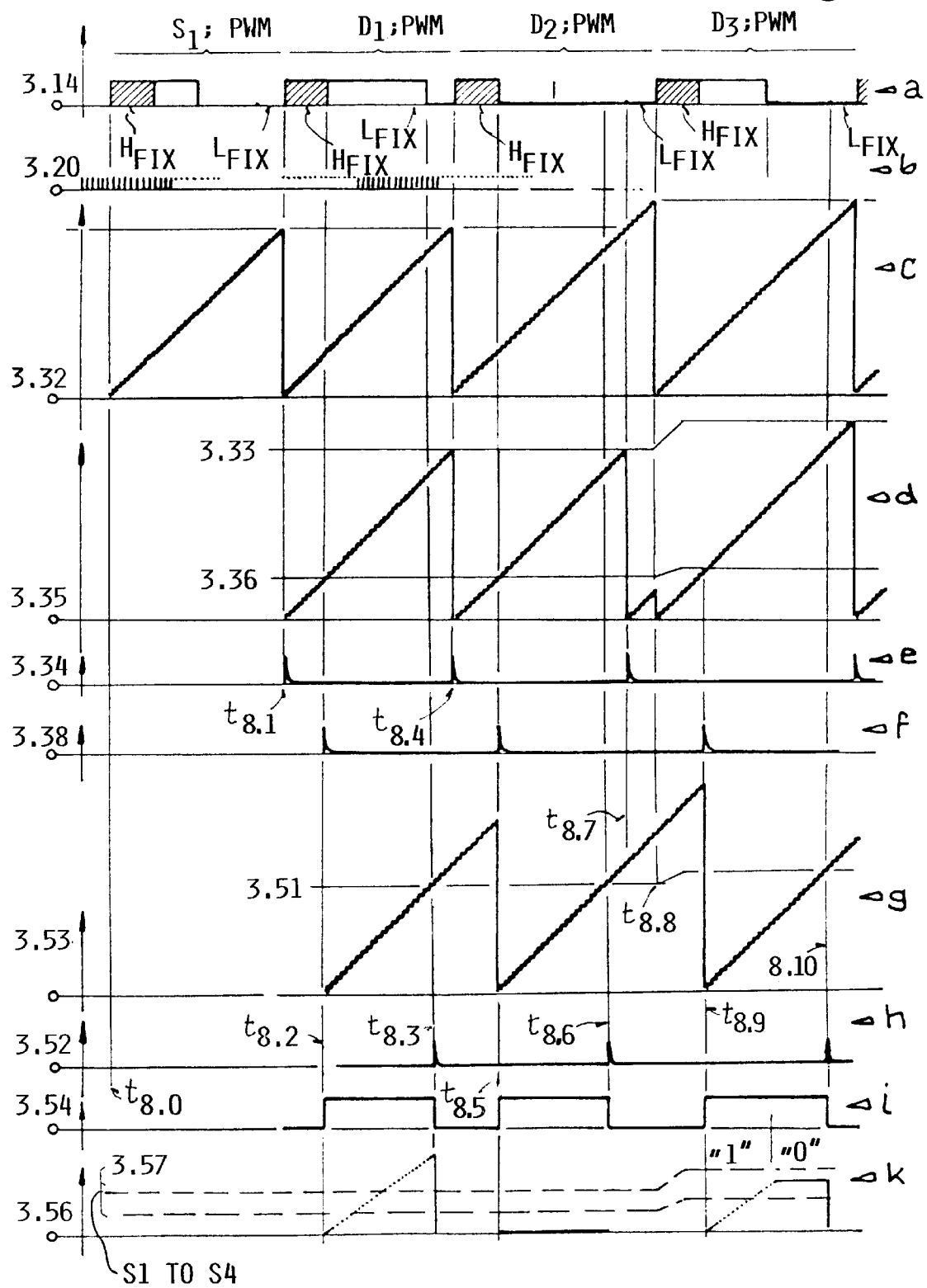
FIG. 8 is a pulse timing diagram illustrating the adjustment or adaptation of the receiver-side clocking frequency of a clock signal generator of FIG. 5 to a slight fluctuation of the transmitting frequency.

FIG. 8 shows a pulse timing diagram for an example embodiment in which the transmitting frequency and therewith the pulse frame spacing is only varied by a small amount. This is especially to be expected if the electrical characteristics of the transmitting or receiving components vary or drift due to thermal effects or the influence of age. While the example discussed below is based on the initial assumption that the transmitting clock frequency is altered, this example is also directly applicable or translatable for the case in which instead the oscillator clock signal drifts in a corresponding fashion.

As shown in FIG. 8, at time $t_{8.0}$, once again after a dead time, a synchronization pulse $S_{PWM}$ is transmitted, and its length or duration is counted or determined by the CFI counter 3.32 as shown in FIG. 8C. At time $t_{8.1}$, the determined count value is provided through the comparator stage 3.49 to the $T_B$ memory 3.33, and from there the value is further processed by the numeric operations in the dividers 3.37 and 3.50, whereupon the results thereof are further transmitted into the memories 3.36 and 3.51. As can be seen in FIG. 8D, the $T_B$ counter 3.35 is reset and the $T_R$ comparator 3.38 reaches the prescribed threshold value stored in the memory 3.36 at time $t_{8.2}$, whereupon the comparator 3.38 releases a clock signal to the $T_A$ counter 3.53, which is thus reset and once again begins to count the number of oscillator cycles or pulses, as shown in FIGS. 8D, 8F and 8G.

At time $t_{8.3}$, the $T_A$ counter 3.53 reaches the threshold value stored in the $T_A$ memory 3.51 and prescribed through the $T_A$ comparator 3.52, whereupon the $T_A$ comparator 3.52 outputs a corresponding clock signal to the flip-flop 3.54. Thereupon, the flip-flop 3.54 generates at its output a signal designating a time window for sampling the data pulse signal level, in a manner similar to that as described in the second example embodiment in FIG. 6I, and as shown particularly for the present example embodiment in FIG. 8I. In the present case however, the duration of the time window is selected over several possible pulse width conditions of the data words, so that respectively exactly one sampling window lies within the respective pulse frame clocking as shown in FIG. 8E, from which all possible PWM pulse widths can be determined. This is made clear especially in FIG. 8K in that the threshold values S1 to S4 shown therein are respectively located at averages or mid-points between the achievable sampled count values for the individual pulse duration widths.

At time $t_{8.41}$ the $T_B$ counter 3.35 reaches the threshold value stored in and prescribed by the $T_B$ memory 3.33, so that the $T_B$ comparator 3.34 transmits a new pulse frame clock signal. In the present example, it is assumed that the next data pulse $D_2PWM$ following the time $t_{8.4}$ has a current actual pulse duration that deviates from the prior pulse duration as shown in FIGS. 8A and 8C. However, the threshold value stored in the $T_B$ memory 3.33 is still based on the old or previous pulse frame spacing, so that the $T_B$ counter 3.35 already generates the next pulse frame clock signal at the time $t_{8.7}$ and thereby resets the counter 3.35. Also, the threshold values stored in the memories 3.33, 3.36, and 3.51 are still set to the previous values, i.e. have not yet been adapted or updated to correspond to the new pulse frame width. At time $t_{8.8}$, however, the CFI counter 3.32 detects or determines the new current pulse frame spacing, accordingly resets the $T_B$ counter 3.35, and provides the new threshold values corresponding to and based on the new pulse frame spacing into the memories 3.33, 3.36, and 3.51, as illustrated in FIGS. 8D and 8G. The threshold values S1 to S4 of the signal level comparator 3.57 are also updated or adapted to correspond to the new pulse frame width, as shown in FIG. 8K. At time $t_{8.9}$, the $T_B$ counter 3.35 reaches the now updated current threshold value in the $T_R$ memory 3.36 and thereupon triggers the resetting of the $T_R$ counter 3.53. As a result, the next subsequent data pulse following time $t_{8.8}$ is thus once again properly acquired or sampled by the time window shown in FIG. 8I.

Figure 9:
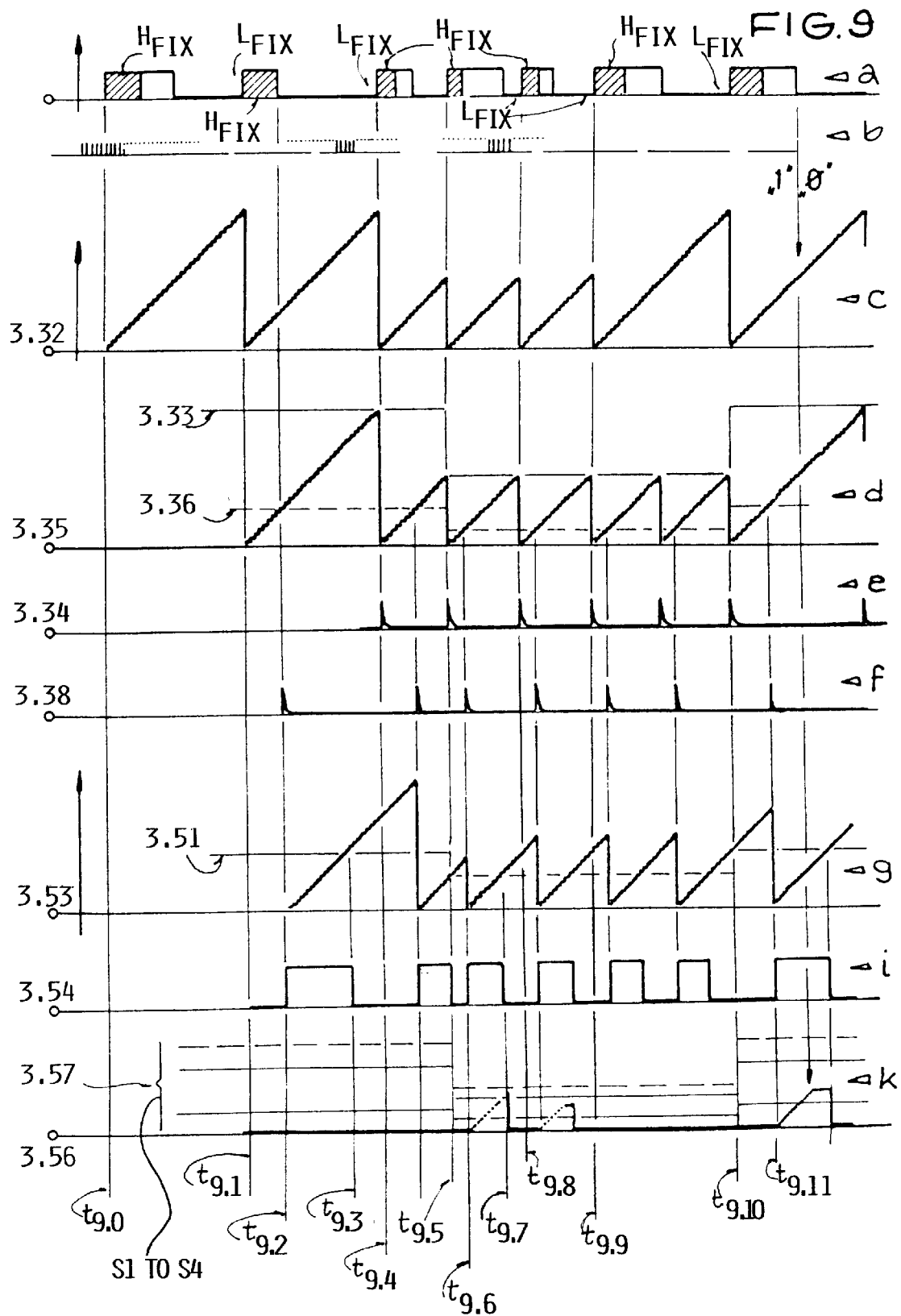
FIG. 9 is a pulse timing diagram for illustrating the adjustment or adaptation of the receiver-side clocking frequency of a clock signal generator of FIG. 5 in the case of doubling and thereafter halving the transmitting frequency.

FIG. 9 shows a further pulse timing diagram for the transmission of a pulse width modulated signal train in which first a synchronization pulse is transmitted at time $t_{9.0}$, whereby the duration of the synchronization pulse is once again determined in the CFI counter 3.32 and is then stored as a threshold value in the $T_B$ memory 3.33 at time $t_{9.1}$. The counters 3.35 and 3.53 again generate the clock signal, from which the flip-flop 3.54 derives the sampling window, as shown in FIG. 9I. If the transmitter-side transmission frequency is increased at time $t_{9.4}$, this is recognized by the $T_A$ counter 3.32 at time $t_{9.5}$, and thereupon the counters 3.35 and 3.53 are reset and the threshold values in memories 3.33, 3.36, and 3.51 are updated or adapted to the new value as shown in FIGS. 9D and 9G. As of time $t_{9.5}$, the clock signal generator 3.18 once again has been adjusted to the actual current pulse frame width.

At time $t_{9.9}$, the transmitter-side transmission clocking frequency is once again slowed down. Although the CFI counter 3.32 has already detected the new current pulse width in the interval following time $t_{9.9}$, as shown in FIG. 9C, the counters 3.35 and 3.53 as well as the memories 3.33, 3.36, and 3.51 still operate based on the old or previous frame width information as shown in FIGS. 9D and 9G. As a result, depending on the severity of the increase or reduction in the transmission clocking frequency, a number of erroneous time windows will arise in the flip-flop 3.54 as shown in FIG. 9I. However, since this error is a known, inherent and consistent error of the system, the transmitter-side circuitry can account for this error. For example, when the transmission frequency is to be varied, at such point in time the transmitter can transmit a data signal that is non-critical, i.e. does not convey significant information and would not lead to any critical state or condition in the respective actuators 11 that are actuated based on the signal. Such a non-critical data signal again may be understood as a synchronization pulse, as discussed above.

At time $t_{9.10}$, the CFI counter 3.32 once again reaches the next positive edge of a subsequent data pulse, provides the corresponding count value through the comparator stage 3.43 to the $T_B$ memory 3.33 and resets the counters 3.35 and 3.53. Moreover, once again the threshold values in the memories 3.36 and 3.51 are adapted to the new values, as shown in FIG. 9. As a result, the next slow data pulse following immediately subsequent to the time $t_{9.10}$ will again be properly detected or sampled in the time window set by the flip-flop 3.54, as shown in FIG. 9K subsequent to time $t_{9.11}$.

FIGS. 10 to 13 show in detail the time progression of the signal level value recognition that takes place in the data acceptance circuit. FIG. 10 shows a very "dirty" or distorted binary signal that has been greatly influenced by interference or distortion on the busline 2.14. Due to the signal distortion, the amplitude of the illustrated binary pulse never completely reaches the prescribed high signal level value of "1", for example due to line damping effects and interference effects of the supply voltage.

While the leading and trailing edges defining the bit duration $T_B$ of the depicted digital bit do not exhibit distinct and sharp transitions from one signal level to the opposite signal level in a level transition sequence of 0-1-0, the present circuit recognizes the signal level transitions within the sampling time window $T_A$ as follows. Namely, the sampling window $T_A$ overlaps, in time, a middle or central portion of the bit duration $T_B$. Within this sampling window $T_A$, the signal level with high probability exceeds the internal threshold value in the AND-gate 2.55, so that the sampling will respectively provide a high signal for the respective individual sampling pulses at which the sampled value exceeded the threshold value. For instance, in the example in FIG. 10, the first and last sampled values within the sampling window $T_A$ do not exceed the threshold values for a high signal, so that these samples provide a low sampling result, while the remaining samples provide a high sampling result. In this context, the sampling pulses respectively correspond to a cycle or pulse of the oscillator, which may be especially advantageously used for this over-sampling operation, as described above, due to its very high frequency.

Next, the output pulses of the AND-gate 2.55 are counted in the signal level value counter 2.56, as represented in FIG. 11. As shown in the Figure, the first and last sampling pulses within the sampling window or duration $T_A$ do not increase the count value in the signal level value counter 2.56, since these first and last sample pulses detected portions of the original data bit that were below the respective threshold level as discussed above. Nonetheless, the remaining high sample pulses are counted and reach a count value in the counter 2.56 that clearly exceeds the trigger threshold S. In the example shown in FIG. 11, the trigger threshold S is set to the average or midpoint value between the maximum possible and minimum possible count values. The minimum count value in the signal level value counter 2.56 is naturally 0, and the maximum value results when the counter 2.56 receives a high signal for each sampling pulse, which is indicated by the expression MAX=$T_A$··1", namely receiving a "1" signal throughout all of sample pulses over the sampling window $T_A$.

FIGS. 12 and 13, when viewed in combination with and in comparison to the above discussed FIGS. 10 and 11, further clarify the principle analogy in the processing of binary and pulse width modulated digital signals also in the signal level value detection. Namely, in an analogous manner, for the time duration $T_A$ of the sampling window, the sampling pulses that are conjunctively combined in the AND-gate 3.55 are counted so as to increment the count value in the signal level value counter 3.56. In the present example, the first and second fixed signal level durations are gated out or omitted due to the delay or retardation time $T_R$, such that the signal level value counter 3.56 actually can have a minimum value of 0.

In this context, the finally achieved counter increment or total count value as shown in FIG. 13 for the counter 3.56 is nearly independent and unaffected by a high frequency interference pulse as represented by a single peak in the time diagram shown in FIG. 12. Namely, the single interference peak ultimately does not affect the signal evaluation results. In FIG. 13, the optimum or maximum possible accumulated signal level values in the counter 3.56 for the four possible data bits are indicated by the numbers 1, 2, 3 and 4. Furthermore, the evaluation thresholds for recognizing that a high bit has been received are represented by $S_0$, $S_1$, $S_2$, and $S_3$ respectively at averages or mid-points between the respective maximum levels. As a result of the transmitted signal 1-0-0-0, the signal evaluation carried out by respectively comparing the counted or accumulated signal levels of the counter 3.56 with the individual thresholds $S_0$, $S_1$, $S_2$, and $S_3$ of the level comparator 3.57 again provides a signal of 1-0-0-0. In other words, the count value of the counter 3.56 exceeds the first threshold $S_0$ and so indicates a high signal for the first data pulse, but does not exceed the subsequent thresholds olds $S_1$, $S_2$, and $S_3$, and thus indicates a low signal for the three subsequent data pulses. It should be noted that the higher the clock frequency of the oscillator is, correspondingly the higher the over-sampling rate will be, and the more likely and possible it will be to avoid the effects of interference in the device components.

With reference to FIGS. 14 and 15, the function of the auxiliary sampling frequency value, and especially the advantages achieved thereby when selecting an increased frequency relative to the normal operation, will now be described in greater detail. In this context, the value of the first data pulse, which will be called the start bit SB in the following, is of great significance. The present special embodiment according to the invention is applicable to all processes of binary data transmission, but is not applicable for pulse width modulated signals, as will now be described in greater detail.

As shown in FIG. 14A, first a synchronizing word SW which comprises at least one synchronization pulse, is transmitted or received at the beginning of a data transmission. In the present example, the synchronizing word SW is an eight bit synchronizing word, and is transmitted at a transmitting clock frequency $T_{normal}$. From this synchronizing word, on the receiver end, the data acceptance clock signal $D_{normal}$ is generated.

At the beginning of the start bit SB, the data acceptance clock signal $D_{normal}$, which in the normal operation corresponds to the transmitting clock frequency $T_{normal}$, is applied to the data acceptance circuit, and the data word DW is transmitted on to the control circuit. Upon receiving the data word DW, the control circuit carries out the necessary operations and then sends an answer data word A back to the central unit after a prescribed transmitting delay ΔS. After the completion of the transmission, a dead time is initiated, which comprises four or more clock cycles of the data acceptance clock signal or of the system clock signal in the peripheral modules. During this dead time, the respective peripheral module is not activated or ready to receive signals. After the end of the dead time, the respective module is again switched into an active or ready-to-receive condition.

FIG. 14B illustrates, by omission of the synchronizing word SW, that the determination or derivation of the sampling frequency from the synchronizing word SW has failed, which may arise as a result of sporadically occurring problems in the data transmission, for example if an interference pulse reaches the clock signal generator together with the data word through the transmitting and receiving arrangement. As a result thereof, a non-synchronized condition or a synchronization interference condition exists. In this case, the clock signal generator will generate a data acceptance clock signal using an auxiliary sampling frequency determined from the most recent previous stored sampling frequency that was determined to be valid.

In order to derive the auxiliary sampling frequency from the last stored sampling frequency, the latter stored frequency value is multiplied by a prescribed factor, preferably the factor 4, for example. In this manner, a data acceptance clock signal $D_{4X}$ is generated, which is substantially faster than the transmitting clock signal or frequency used by the central unit. FIG. 14B schematically illustrates the data acceptance clock signal $D_{4X}$ in comparison to the data word $D_W$ transmitted by the central unit and the transmitting clock frequency $T_{normal}$ associated therewith. As can be seen, due to the four-fold faster data acceptance clock signal $D_{4X}$, three samplings will be carried out already during the duration of the start bit SB itself, and the remaining five samplings will be carried out in such a manner that the first bit of the data word is sampled four times and the second bit of the data word is sampled once.

Since the frequency of the system clock corresponds to the sampling frequency used for the functional unit, the subsequent processing of the apparent received data will be carried out very quickly and the next subsequent dead time will be greatly shortened or reduced in duration, so that the module is thereafter switched back to a ready-to-receive condition very quickly. The very quick data acceptance in the case of interference, which is carried out multi-fold quicker than the normal data acceptance, for example using the four-fold sampling frequency as described above, achieves the further advantage that a collective bus address for all modules of the system cannot be erroneously read from the interference, if the collective bus address signal has been properly selected. For example, it is advantageous to use the signal 1-0-1-0 as the collective bus address. Since a bit having the value 1 is interpreted as a signal 1-1-1-1 in the present example using a four-fold faster sampling rate, while a bit having the value 0 is interpreted or sampled as 0-0-0-0, the collective bus address cannot be erroneously received, regardless of the actual bit values in the transmitted data word. Even if the samplings accorded to the transmitted address detect or sample a period overlapping two bits, then the bit sequences 1-1-1-0 or 0-0-1-1 for example may be determined, but the suitably selected collective bus address 1-0-1-0 will not be determined.

In this manner, it is possible to reliably exclude or prevent the inadvertent and erroneous actuation of the peripheral modules, especially in a safety system, and particularly the erroneous actuation or triggering of the occupant protective devices in a vehicle safety system, as a result of a synchronization interference. This is true even if the system uses a collective bus address in order to activate all modules simultaneously, for example in the case of a particularly severe or serious vehicle collision or other accident. Namely, the collective bus address will only be received and interpreted in the modules as having been transmitted when it was actually transmitted. The possibility of accidental triggerings is thus avoided or reduced.

The method for transmitting data according to the invention can also be used even if no start bit is provided and associated with the data word, as shown in FIG. 14C. In this case, the data acceptance begins after a prescribed waiting time or holding time which immediately follows the end of the synchronizing word SW, and which, for example has a time duration of two clock cycles. Since the data acceptance clock signal D is formed with an increased sampling frequency in the case of an interference-effected synchronization, the above mentioned waiting time or holding time until the beginning of the data acceptance procedure will also be correspondingly shortened as shown in FIG. 14C.

For example, in the respective peripheral module of interest, the respective signal levels present during the last bit of the synchronizing word SW, during the time delay or interval between the synchronizing word SW and the data word DW, and during the first bit of the data word DW will be sampled, so that the bit sequence 0-0-0-0-0-0-1-1 will result, for example, as shown in FIG. 14C. Also in this case, the collective bus address cannot be inadvertently and erroneously determined.

FIG. 15 schematically represents a situation in which the central unit of a vehicle safety system carries out a data transmission to the individual modules with an increased emergency sampling frequency $T_{4X}$ in the case of an emergency activation such as a serious vehicle accident. In this case, any interference signals in the transmission of the clock frequency information are meaningless, since the modules automatically switch to the emergency sampling frequency $D_{4X}$ in such an emergency situation. In this manner, the triggering or actuation of the individual protective devices is reliably ensured in such a case of a dangerous collision accident or the like.

It is especially advantageous if the transmitting operation of a peripheral module is suppressed or prevented as a result of any interference in the transmission of the clock frequency information. That is to say, as soon as an interference in the transmission of the clock frequency information occurs in the module, on the one hand the operation of the module is switched over to the emergency sampling frequency for generating the data acceptance clock signal in order that the module may be switched back to receiving operation as soon as possible, and on the other hand a possible transmitting operation of the module is suppressed or blocked. In this manner, any interference or disruption on the data bus caused by non-synchronized or erroneous transmissions from the module is prevented.

By using the method according to the invention for transmitting data in a system, and especially a safety system in a motor vehicle, it is thus possible to exclude or prevent an erroneous actuation of the protective devices by the modules 13 as a result of interference in the synchronizations. However, even if the synchronization is effected by interference, in the case of an emergency the data transmission to the individual modules will reliably and properly be carried out, nonetheless. Since the individual modules are very quickly again switched to a ready-to-receive condition in the event of an erroneous transmission of the clock frequency information, the central unit can further carry on its normal self-test or monitoring operation, without having to take any regard to the respective condition of the bus.

Although the invention has been described with reference to specific example embodiments, it will be appreciated that it is intended to cover all modifications and equivalents within the scope of the appended claims.

What is claimed is:

1. A method of transmitting digital data in a system including a transmitting unit and a receiving unit that includes a data acceptance clock signal generator having a controllable clock frequency, said method comprising the steps:
    (a) transmitting from said transmitting unit a synchronization pulse train including at least one synchronization pulse and containing a synchronizing time point and a clock frequency information;
    (b) after said step (a), transmitting from said transmitting unit a data signal including said digital data;
    (c) after said step (a), receiving said synchronization pulse train and ascertaining said clock frequency information from said synchronization pulse train in said receiving unit, wherein said step of ascertaining said clock frequency information comprises determining a respective pulse duration of said at least one synchronization pulse and deriving said clock frequency information from said pulse duration;
    (d) after said step (c), synchronizing said data acceptance clock signal generator with said synchronizing time point and controlling said controllable clock frequency of said data acceptance clock signal generator so as to generate therewith a data acceptance clock signal having a clock frequency that is adapted in accordance with said ascertained clock frequency information; and
    (e) receiving said data signal in accordance with said data acceptance clock signal in said receiving unit;
wherein said data signal includes at least one data pulse in a data word, said at least one synchronization pulse and said at least one data pulse are respectively pulse width modulated, said clock frequency information contains information indicating a duration of said data word, and said data word and said synchronization pulse train respectively include a first portion having a prescribed first signal level existing for at least a first fixed signal level duration and a second portion having a prescribed second signal level opposite said first signal level existing for at least a second fixed signal level duration, wherein said first portion and said second portion together define a pulse frame width, and further comprising the following steps:
    (f) forming a plurality of Pulse frames of said data acceptance clock signal respectively having said pulse frame width, from said information indicating a length of said data word contained in said clock frequency information; and
    (g) carrying out said step (e) so as to receive said data word during a respective one of said pulse frames, wherein said data word contains said data in said first portion having said prescribed first signal level within and at a beginning of said respective pulse frame, and said second portion of said data word having said prescribed second signal level occurs at an end of said respective pulse frame, such that a signal level transition occurs at a transition from said end of said respective pulse frame to a beginning of a next successive one of said pulse frames.

2. The method according to claim 1, wherein said clock frequency of said data acceptance clock signal is so adapted that it corresponds to said ascertained clock frequency information.

3. The method according to claim 1, wherein said clock frequency information contains said clock frequency of said data acceptance clock signal.

4. The method according to claim 1, wherein said respective pulse duration each of said at least one synchronization pulse corresponds to a respective duration of each of said at least one data pulse.

5. The method according to claim 1, wherein said receiving unit includes an oscillator having an oscillator frequency that is substantially greater than a reciprocal of said respective pulse duration of said at least one synchronization pulse, and wherein said step of ascertaining said clock frequency information at least for a first time comprises generating with said oscillator a series of oscillator pulses at said oscillator frequency, comparing said respective pulse duration of said synchronization pulse with said oscillator frequency, counting the number of said oscillator pulses occurring during said respective pulse duration of said synchronization pulse to provide a count value corresponding to said number, and deriving said clock frequency information from said count value by using said count value as a representation of said respective pulse duration and deriving therefrom a current pulse frame width that represents said clock frequency information.

6. The method according to claim 5, wherein said step of generating said clock signal using said clock frequency information comprises generating a first pulse frame clock signal synchronously with at least a beginning of a first one of said at least one data pulse, zeroing and restarting said counting of said number of said oscillator pulses in a first counter to provide said count value corresponding to said number, then continuing said counting following said first pulse frame clock signal, and according to the principle of an overflow counter, when said count value reaches and corresponds to a current value of said pulse frame width, generating a second pulse frame clock signal and again zeroing and restarting said counting.

7. The method according to claim 6, further comprising generating subsequent pulse frame clock signals after said second pulse frame clock signal from said current value of said pulse frame width, wherein said generating of at least said subsequent pulse frame clock signals comprises:

synchronously with a given $n^{th}$ one of said pulse frame clock signals, and parallel with and independently of said counting of said number of said oscillator pulses in said first counter, carrying out in a second counter a second counting of the number of said oscillator pulses until said signal level transition occurs at an end of said second fixed signal level duration after said given $n^{th}$ one of said pulse frame clock signals to determine a current value of said duration of said data word, comparing said determined current value of said duration of said data word with a prescribed value range, setting a current $(n+1)^{th}$ value of said pulse frame width equal to said current value of said duration of said data word if said current value of said duration of said data word falls within said prescribed value range, and setting a current $(n+1)^{th}$ value of said pulse frame width equal to one of a prescribed auxiliary value and an immediately previous value of said pulse frame width if said current value of said duration of said data word falls outside of said prescribed value range, and generating an $(n+2)^{th}$ pulse frame clock signal after expiration of a duration of said current $(n+1)^{th}$ value of said pulse frame width.

8. The method according to claim 7, wherein said auxiliary value is an integer fractional portion, at most ½, of a typical pulse frame width in normal operation according to a prescribed range of said prescribed auxiliary value, so that a system clock signal or pulse frame clock signal derived from said auxiliary value correspondingly comprises a higher clock frequency, which is at least twice said frequency in normal operation.

9. The method according to claim 7, wherein said step of generating said data acceptance clock signal from said pulse frame clock signals first comprises subtracting the fixed signal level duration from said current value of said pulse frame width to provide a resultant value, and then deriving a current time duration of a current one of said data pulses as an approximation from said resultant value in that said resultant value is divided by the number of said data pulses occurring within said data word.

10. The method according to claim 9, a data acceptance clock signal generator operating as an overflow counter with a variable overflow end is provided for generating said data acceptance clock signal, wherein a current value of said overflow end of said data acceptance clock signal generator is smaller than said current time duration of said current one of said data pulses, and further comprising a step in which said data acceptance clock signal generator counts the pulses of said pulse frame clock signals until said overflow end is reached, and then generates said data acceptance clock signal which is phase-shifted relative to said pulse frame clock signals.

11. The method according to claim 10, wherein a first one of said data acceptance clock signal is generated at approximately 50% of said current time duration of said current data pulse, in that said overflow end is set to the integer value closest to half of said current time duration of said current data pulse.

12. The method according to claim 10, wherein subsequent ones of said data acceptance clock signals are respectively generated after expiration of said current time duration of said current data pulse, in that said overflow end is set to the integer value closest to said current time duration of said current data pulse.

13. The method according to claim 7, further comprising prescribing a sampling time span, which is shorter than a current calculated time duration of a respective current one of said data pulses, and which begins after a delay time determined as a constant value or as a defined fractional portion of said current calculated time duration of said current data pulse, and further comprising sampling the signal level of said current data pulse at least once within 0 said sampling time span.

14. The method according to claim 13, wherein said sampling time span is a multiple of an oscillation period of said oscillator, and wherein said sampling is carried out at said oscillator frequency within said sampling time span, in that said signal level of each said data pulse is conjunctively combined with said oscillator pulses to form resulting sampling Pulses, said resulting sampling pulses are counted, a sample count value is determined, and therefrom said signal level of said current data pulse is determined.

15. The method according to claim 13, wherein said sampling time span is approximately 50% of said current calculated time duration of said current data pulse.

16. The method according to claim 13, wherein said delay time after which said sample time span begins is approximately 25% of said current calculated time duration of said current data pulse.

17. The method according to claim 16, further comprising determining a data pulse value of said current data pulse by comparing said sample count value with a threshold value which lies between a first sample count value existing for a permanently present first signal level and a second sample count value existing for a permanently present second signal level during said sampling time span.

18. The method according to claim 17, wherein, for sampling said data word which is pulse width modulated, in accordance with said pulse frame clock signals, the method further comprises prescribing a sampling time span, which is shorter than said current value of said pulse frame width, and which begins after a delay time that is determined as a constant value or as a defined fractional portion of said current value of said pulse frame width, and which is a multiple of an oscillation period corresponding to said oscillator frequency of said oscillator, and further comprising sampling the signal level of each said data pulse at least once within said sampling time span, and wherein the signal level of said pulse width modulated data word is sampled during said sampling time span at a frequency of a comparative oscillator, in that the signal level of said data word is conjunctively combined with a clock signal of said comparative oscillator to provide resulting sample pulses, and said resulting sample pulses are counted and detected as a sample count value, and for recognizing the data pulse value of said data Pulse, the method further comprises comparing said sample count value with a number of thresholds, whereby the number and the respective values of said thresholds are determined by the number and the respective nominal values of the possible logical signal levels, whereby preferably for respectively equal steps comprising a number of said oscillator clock signals, a respective one of said thresholds is correspondingly arranged at a midpoint between two respectively successive ones of said logical signal levels.

19. A method of transmitting digital data in a system including a transmitting unit and a receiving unit that includes a data acceptance clock signal generator having a controllable clock frequency, said method comprising the steps:

(a) transmitting from said transmitting unit a synchronization pulse train including at least one synchronization pulse and containing a synchronizing time point and a clock frequency information;

(b) after said step (a), transmitting from said transmitting unit a data signal including said digital data;

(c) after said step (a), receiving said synchronization pulse train and ascertaining said clock frequency information from said synchronization pulse train in said receiving unit, wherein said step of ascertaining said clock frequency information comprises determining a respective pulse duration of said at least one synchronization pulse and deriving said clock frequency information from said pulse duration;

(d) after said step (c), synchronizing said data acceptance clock signal generator with said synchronizing time point and controlling said controllable clock frequency of said data acceptance clock signal generator so as to generate therewith a data acceptance clock signal having a clock frequency that is adapted in accordance with said ascertained clock frequency information; and (e) receiving said data signal in accordance with said data acceptance clock signal in said receiving unit;

wherein said receiving unit includes an oscillator having an oscillator frequency that is substantially greater than a reciprocal of said respective pulse duration of said at least one synchronization pulse, and wherein said step of ascertaining said clock frequency information at least for a first time comprises generating with said oscillator a series of oscillator pulses at said oscillator frequency, comparing said respective pulse duration of said synchronization pulse with said oscillator frequency, counting the number of said oscillator pulses occurring during said respective pulse duration of said synchronization pulse to provide a count value corresponding to said number, and deriving said clock frequency information from said count value by using said count value as a representation of said respective pulse duration and deriving therefrom a current system clocking interval between a respective system clock signal pulse and a next successive system clock signal pulse.

20. The method according to claim 19, wherein said oscillator frequency is a multiple of said reciprocal of said respective pulse duration.

21. The method according to claim 19, further comprising comparing said count value with a prescribed value range, and wherein said step of deriving said current system clocking interval from said count value comprises setting said current system clocking interval equal to said count value if said count value falls within said prescribed value range, and setting said current system clocking interval equal to one of a prescribed auxiliary clocking value and an immediately previous value of said current system clocking interval if said count value falls outside of said prescribed value range.

22. The method according to claim 21, wherein said synchronization pulse train includes a plurality of said synchronization pulses each having respective pulse durations, wherein said step of counting the number of oscillator pulses comprises individually counting the respective numbers of said oscillator pulses occurring during said respective pulse durations of said plural synchronization pulses and providing a plurality of count values respectively corresponding to said respective numbers, and wherein said step of deriving said current system clocking interval comprises setting said current system clocking interval equal to one of: an integer value closest to the arithmetic mean of all of said plural count values if all of said plural count values fall within said prescribed value range; an integer value closest to the arithmetic mean of only those ones of said plural count values that fall within said prescribed value range if some of said count values fall within said prescribed value range and some of said count values fall outside of said prescribed value range; and one of said prescribed auxiliary clocking value and said immediately previous value of said current system clocking if all of said count values fall outside of said prescribed value range.

23. The method according to claim 22, wherein said step of deriving said current system clocking interval comprises setting said current system clocking interval equal to said prescribed auxiliary clocking value, and wherein said prescribed auxiliary clocking value corresponds to an integer fractional portion of a typical pulse interval for a normal operation within said prescribed value range, such that said current system clocking interval has a clocking frequency that is higher than a normal frequency that exists in said normal operation.

24. The method according to claim 23, wherein said integer fractional portion is not more than ½, and said clocking frequency is at least twice said normal frequency.

25. The method according to claim 24, wherein said integer fractional portion is ½, and said clocking frequency is four times said normal frequency.

26. The method according to claim 19, wherein said data signal includes at least one data pulse, wherein said step of generating said data acceptance clock signal comprises generating a first system clock signal pulse synchronously with at least a beginning of a first one of said at least one data pulse, zeroing and restarting said counting of said number of said oscillator pulses to provide said count value corresponding to said number, then continuing said counting following said first system clock signal pulse, and according to the principle of an overflow counter, when said count value reaches and corresponds to said current system clocking interval, generating a second system clock signal pulse and again zeroing and restarting said counting.

27. The method according to claim 26, wherein a data acceptance clock signal counter operating as an overflow counter with a variable overflow end is provided for generating said data acceptance clock signal, wherein a respective current value of said overflow end of said data acceptance clock signal counter is smaller than a respective current value of said current system clocking interval, and further comprising a step in which said data acceptance clock signal counter counts a succession of said system clock signal pulses until said overflow end is reached, and then generates a data acceptance clock signal Pulse that is phase-shifted relative to said system clock signal pulses, and wherein said counting of said oscillator pulses is restarted from anew upon reaching a next one of said system clock signal pulses.

28. The method according to claim 27, wherein said data acceptance clock signal pulses are generated at a frequency of approximately 50% of that of said system clock signal pulses, in that said current value of said overflow end is set to an integer value closest to half of said current value of said system clock signal interval.

29. The method according to claim 26, wherein said step of generating said data acceptance clock signal further comprises prescribing a sampling time span, which is within a duration between two successive ones of said system clock signal pulses, and which is shorter than a respective current value of said current system clocking interval, and which begins after a delay time determined as a constant value or as a defined fractional portion of said system clocking interval, and further comprising sampling the signal level of each said data pulse at least once within said sampling time span.

30. The method according to claim 29, wherein said sampling time span is a multiple of an oscillation period of said oscillator, and wherein said sampling is carried out at said oscillator frequency within said sampling time span, in that said signal level of each said data pulse is conjunctively combined with said oscillator pulses to form resulting sampling pulses, said resulting sampling pulses are counted, a sample count value is determined, and therefrom said signal level of said respective data pulse is determined.

31. The method according to claim 30, wherein said sampling time span is approximately 50% of the time duration of said current system clocking interval.

32. The method according to claim 30, wherein said delay time after which said sampling time span begins is the integer value closest to approximately 25% of said current system clocking interval.

33. The method according to claim 30, further comprising determining a data pulse of said respective data pulse by comparing said sample count value with a threshold value which lies between a first sample count value existing for a permanently present first signal level and a second sample count value existing for a permanently present second signal level during said sampling time span.

34. A control system for transmitting digital data comprising a transmitter and a peripheral receiver including a clock signal frequency information acquisition circuit, a data acceptance clock signal generator with a controllable clock frequency and an oscillator, in which said transmitter transmits a synchronization pulse train including at least one synchronization pulse before transmitting the data to be transmitted, wherein the synchronization pulse train synchronizes said data acceptance clock signal generator in said receiver, wherein said clock signal frequency information acquisition circuit is clocked by said oscillator so as to acquire a clock frequency information contained within the synchronization pulse train and passes the clock frequency information to said clock signal generator, which in turn is clocked by the same said oscillator so as to generate a data acceptance clock signal corresponding to the clock frequency information, wherein said clock frequency information acquisition circuit comprises a first counter which ascertains the clock frequency information in the form of the number of the oscillator pulses of said oscillator to determine a count value, and wherein the count value of the oscillator pulses is provided further to said clock signal generator, which comprises a second counter that counts the number of the oscillator pulses and then respectively Generates a system clock signal upon reaching the count value.

35. The control system according to claim 34,
wherein said peripheral receiver further comprises a first memory in which the count value determined by said clock frequency information acquisition circuit is respectively stored,
further comprising a second memory connected with said first memory through a first numerical element,
wherein the first numerical element is programmed to carry out a predetermined division of and/or subtraction from the respective stored value of said first memory and then provides the respective resulting value to be stored in said second memory,
further comprising a third memory connected to the first memory via a second numerical element, whereby said second numerical element is programmed to carry out a prescribed division of and/or subtraction from the respective stored value of said first memory and then provides the respective resulting value to be stored in said third memory,
further comprising first, second and third comparator circuits, a sampling window flip-flop, and a data acceptance circuit including a third counter and a comparator,
said first counter is clocked by the same said oscillator as said clock signal frequency information acquisition circuit, and counts the number of the oscillator pulses of said oscillator, and the resulting count value is respectively passed on to said first comparator circuit, which compares the respective resulting count value with the respective stored value of said first memory and upon reaching the respective stored value generates a system clock signal,
the respective count value of said first counter is also compared in said second comparator circuit with the respective stored value of said second memory, and upon reaching the respective stored value a pulse is transmitted to the set input of said sampling window flip-flop,
said second counter is reset by the pulse from said second comparator circuit and is similarly clocked by the same said oscillator to count the oscillator pulses of said oscillator,
and said third comparator circuit compares the count value of said second counter with the respective stored value of said third memory and upon reaching the respective stored value sends a pulse to the reset input of said sampling window flip-flop,
and, during the time interval between the pulse at the set input and the pulse at the reset input, said sampling window flip-flop transmits an output signal having a corresponding duration to said data acceptance circuit which, during this time interval, conjunctively combines the output signal with the oscillator clock signal,
and said third counter of said data acceptance circuit counts the number of the oscillator clock signals for which a predetermined data signal level existed, and the respective count value is then compared with at least one threshold in said comparator, and the data signal level is derived therefrom.

* * * * *

UNITED STATES PATENT AND TRADEMARK OFFICE
CERTIFICATE OF CORRECTION

PATENT NO. : 5,969,631
DATED : Oct. 19, 1999
INVENTOR(S) : Ammler et al.

It is certified that error appears in the above-identified patent and that said Letters Patent is hereby corrected as shown below:

Col. 10, line 53, after "or", replace "nt", by --nth--.
Col. 14, line 67, after "pulse", replace "$SYN_21$", by --$SYN_{21}$--.
Col. 16, line 52, after "counter", replace "2.322" by --$2.32_2$--;
Col. 18, line 17, after "of", insert --the--;
        line 32, after "succession", delete "is".
Col. 22, line 34, after "time", replace "$t_{8.41}$" by --$t_{8.4'}$--
Col. 24, line 22, after "expression", replace "MAX=$T_{A..}1$" " by --MAX = $T_A$ •"1"--.
Col. 28, line 7, before "frames", replace "Pulse" by --pulse--.
Col. 29, line 41, after "claim 9,", insert --wherein--.
Col. 30, line 5, after "within", delete "0";
        line 13, before "said", replace "Pulses," by --pulses,--;
        line 51, before "the", replace "Pulse," by --pulse,--.
Col. 32, line 6, after "clocking", insert --interval--;
        line 22, after "is", replace "½" by --¼--;
        line 47, after "signal", replace "Pulse" by --pulse--.
Col. 33, line 47, after "respectively", replace "Gen-" by --gen- --.

Signed and Sealed this

Twenty-eighth Day of March, 2000

*Attest:*

Q. TODD DICKINSON

*Attesting Officer*     *Commissioner of Patents and Trademarks*